United States Patent
Ortiz Egea et al.

(10) Patent No.: US 12,045,959 B2
(45) Date of Patent: Jul. 23, 2024

(54) SPATIAL METRICS FOR DENOISING DEPTH IMAGE DATA

(71) Applicant: Microsoft Technology Licensing, LLC, Redmond, WA (US)

(72) Inventors: Sergio Ortiz Egea, San Jose, CA (US); Augustine Cha, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 17/445,825

(22) Filed: Aug. 24, 2021

(65) Prior Publication Data
US 2023/0081137 A1    Mar. 16, 2023

(51) Int. Cl.
| | | |
|---|---|---|
| G06T 5/70 | (2024.01) | |
| G01S 17/42 | (2006.01) | |
| G01S 17/894 | (2020.01) | |
| G06T 5/20 | (2006.01) | |
| G06T 7/11 | (2017.01) | |
| G06T 7/521 | (2017.01) | |

(52) U.S. Cl.
CPC .............. *G06T 5/70* (2024.01); *G01S 17/42* (2013.01); *G01S 17/894* (2020.01); *G06T 5/20* (2013.01); *G06T 7/11* (2017.01); *G06T 7/521* (2017.01); *G06T 2207/10028* (2013.01)

(58) Field of Classification Search
CPC . G06T 5/002; G06T 7/521; G06T 7/11; G06T 5/20; G06T 2207/10028; G01S 17/894; G01S 17/42
See application file for complete search history.

(56) References Cited

U.S. PATENT DOCUMENTS

| | | | |
|---|---|---|---|
| 8,879,050 B2 | 11/2014 | Ko | |
| 9,602,796 B2 | 3/2017 | Chandra et al. | |
| 2006/0221250 A1 | 10/2006 | Rossbach et al. | |

(Continued)

FOREIGN PATENT DOCUMENTS

| | | |
|---|---|---|
| CN | 103748479 B | 4/2016 |
| WO | 2020219244 A1 | 10/2020 |
| WO | 2020251695 A1 | 12/2020 |

OTHER PUBLICATIONS

"International Search Report and Written Opinion Issued in PCT Application No. PCT/US22/037036", Mailing Date: Oct. 28, 2022, 16 Pages.

(Continued)

*Primary Examiner* — Utpal D Shah
(74) *Attorney, Agent, or Firm* — Alleman Hall & Tuttle LLP

(57) ABSTRACT

Examples are disclosed relating to performing denoising and adaptive precision control on time-of-flight sensor data using noise metrics. One example provides a computing system, comprising, a logic machine, and a storage machine holding instructions executable by the logic machine to obtain time-of-flight (ToF) image data comprising a plurality of pixels, for each pixel of the ToF image data, determine one or more noise metrics by applying a spatial kernel, segment the ToF image data based on the one or more noise metrics to obtain differently classified pixels, during a denoising phase, process pixels of a first classification differently than pixels of a second classification, after the denoising phase, determine a depth image, and output the depth image.

19 Claims, 28 Drawing Sheets

(56) References Cited

U.S. PATENT DOCUMENTS

| | | |
|---|---|---|
| 2016/0161610 A1 | 6/2016 | Hiromi |
| 2019/0079192 A1* | 3/2019 | Fenton .................... G01S 17/42 |
| 2019/0302244 A1* | 10/2019 | Egea ....................... G01S 17/26 |
| 2019/0369218 A1 | 12/2019 | Kamimura |
| 2020/0074608 A1 | 3/2020 | Beshinski et al. |
| 2020/0333877 A1* | 10/2020 | Ortiz Egea ............. G01S 7/493 |
| 2020/0349728 A1 | 11/2020 | Bitan et al. |
| 2020/0393245 A1* | 12/2020 | Ortiz Egea ............ H04N 23/81 |
| 2023/0291886 A1* | 9/2023 | Zhu ..................... H04N 13/268 |
| | | 348/46 |

OTHER PUBLICATIONS

Garcia, et al., "A New Multi-lateral Filter for Real-Time Depth Enhancement", In Proceedings of 8th IEEE International Conference on Advanced Video and Signal Based Surveillance, Aug. 30, 2011, pp. 42-47.

Peppa, Maria Valasia, "Precision Analysis of 3D Camera", In Master of Science Thesis in Geodesy No. 3129, TRITA-GIT EX 13-009, School of Architecture and the Built Environment, Royal Institute of Technology, Sep. 2013, 166 Pages.

\* cited by examiner

SPATIAL METRICS FOR DENOISING DEPTH IMAGE DATA

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which light emitted by the ToF camera travels to that point and then returns back to a sensor of the ToF camera. The raw data collected at the depth sensor is processed to produce a depth image.

SUMMARY

Examples are disclosed that relate to denoising time-of-flight sensor data based upon spatial noise metrics. One example provides a computing system comprising a logic machine, and a storage machine holding instructions executable by the logic machine to obtain time-of-flight (ToF) image data comprising a plurality of pixels. The instructions are further executable to, for each pixel of the ToF image data, determine one or more noise metrics by applying a spatial kernel, and segment the ToF image data based on the one or more noise metrics to obtain differently classified pixels. The instructions are further executable to, during a denoising phase, process pixels of a first classification differently than pixels of a second classification, determine a depth image after the denoising phase, and output the depth image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
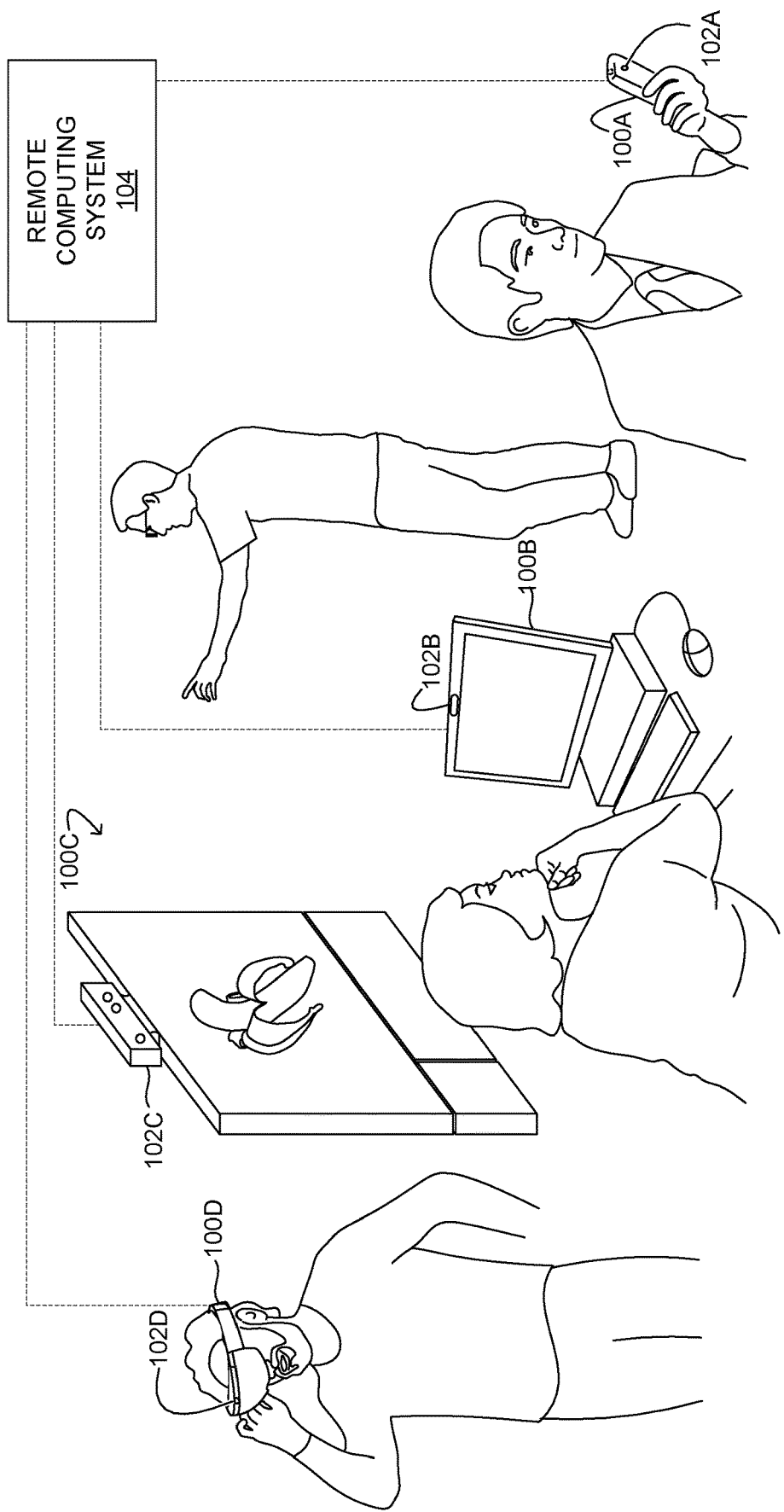
FIGS. 1A-1B show example electronic devices comprising time-of-flight (ToF) cameras.

As mentioned above, time-of-flight (ToF) depth cameras measure, for each sensor pixel of a depth image sensor, a length of a time interval for light emitted by the depth camera to return back to the sensor pixel. As reflectivity may vary across objects in a scene, some pixels may sense signals with low signal to noise ratios in some instances. Low reflectivity, signal contamination, and/or other sources of noise may lead to poor depth estimates and unsatisfactory depth images.

Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The phase shift in the light reflected back from the subject is proportional to the subject's distance modulo the wavelength of the modulation frequency. However, due to the periodic nature of the modulated light, the measured total phase repeats (or wraps) every $2\pi$. Since the number of wrappings cannot be directly measured via a phase based ToF pixel, the total phase, and thus the actual distance related to the measurement, is ambiguous. To address this issue, two or more different modulation frequencies can be used to increase the range of unambiguity, allowing the phase information to be "unwrapped" for the accurate determination of distance. Phase unwrapping is a way to disambiguate the phase shift data by illuminating the scene with amplitude-modulated light of a plurality of different frequencies, as the distance ambiguities are different for each frequency of illumination light.

Noise can lead to incorrect unwrapping, and thus relatively large errors in a determined distance at a pixel. As such, depth engine pipelines (processing pipelines used to process depth image data) commonly include procedures to denoise the data prior to performing phase unwrapping. For example, a depth sensor may perform multi-frequency phase collection to obtain noisy data for a plurality of modulation frequencies. Then, the noisy data is processed via signal calibration correction and denoising. Denoising processes generally utilize convolutions that apply a m×n kernel of pixels around a pixel being denoised. After denoising, the total phase can be calculated from the complex signal, followed by phase unwrapping and crosstalk correction. Additionally, in some examples, an intensity image may be obtained from the denoised data via active brightness averaging. The final depth and, in some examples, intensity images are then output, e.g., for use in gesture identification, AR applications, and/or other uses.

Various denoising operations may be utilized, including multipath corrections, crosstalk corrections, smoothing operations, and/or jitter reduction, for example. In some approaches, these denoising operations may be applied over all depth data. However, applying the same denoising filters to all pixels may be computationally expensive. Additionally, current ToF denoising filters, such as edge-preserving filters, do not provide for control of different levels of denoising for different pixels. Such denoising may affect spatial frequencies, and thus textures, in depth images. As different applications may operate acceptably with different resolutions of depth data, such uniform denoising may not be optimal where depth image data is intended to be consumed by different applications.

Accordingly, examples are disclosed that relate to using spatial noise metrics to predict noise for each pixel, and denoising each pixel based on the noise metrics. Spatial noise metrics can be computed from coarse depth data, active brightness data, and/or complex domain ToF image data in various examples. The resulting noise metrics may be used to classify pixels, thereby allowing the pixels to be segmented based upon classification. Pixels of different classifications may be processed differently during a denoising phase of depth image processing.

In some examples, an adaptive spatial denoising kernel may be applied to pixels of selected classification(s) based on the noise metric(s), wherein the adaptive denoising kernel is varied based upon the spatial noise metric, thereby allowing precision control of denoising. An adaptive denoising kernel may be used, for example, for jitter reduction. In such examples, an adaptive spatial denoising kernel may be adapted on a per-pixel basis to provide a target precision (e.g. as specified by a user). Some areas in a depth image may be processed to achieve low noise (large smoothing) with corresponding lower precision, while textures may be processed to achieve high precision. The adaptive denoising examples disclosed herein may produce a flat precision that lasts over a range of signal-to-noise ratios, while the kernel size stands. This may be suitable for use in many applications, including mixed reality, industrial applications, IoT, and for both embedded and distributed depth image processing platforms.

Figure 1B:
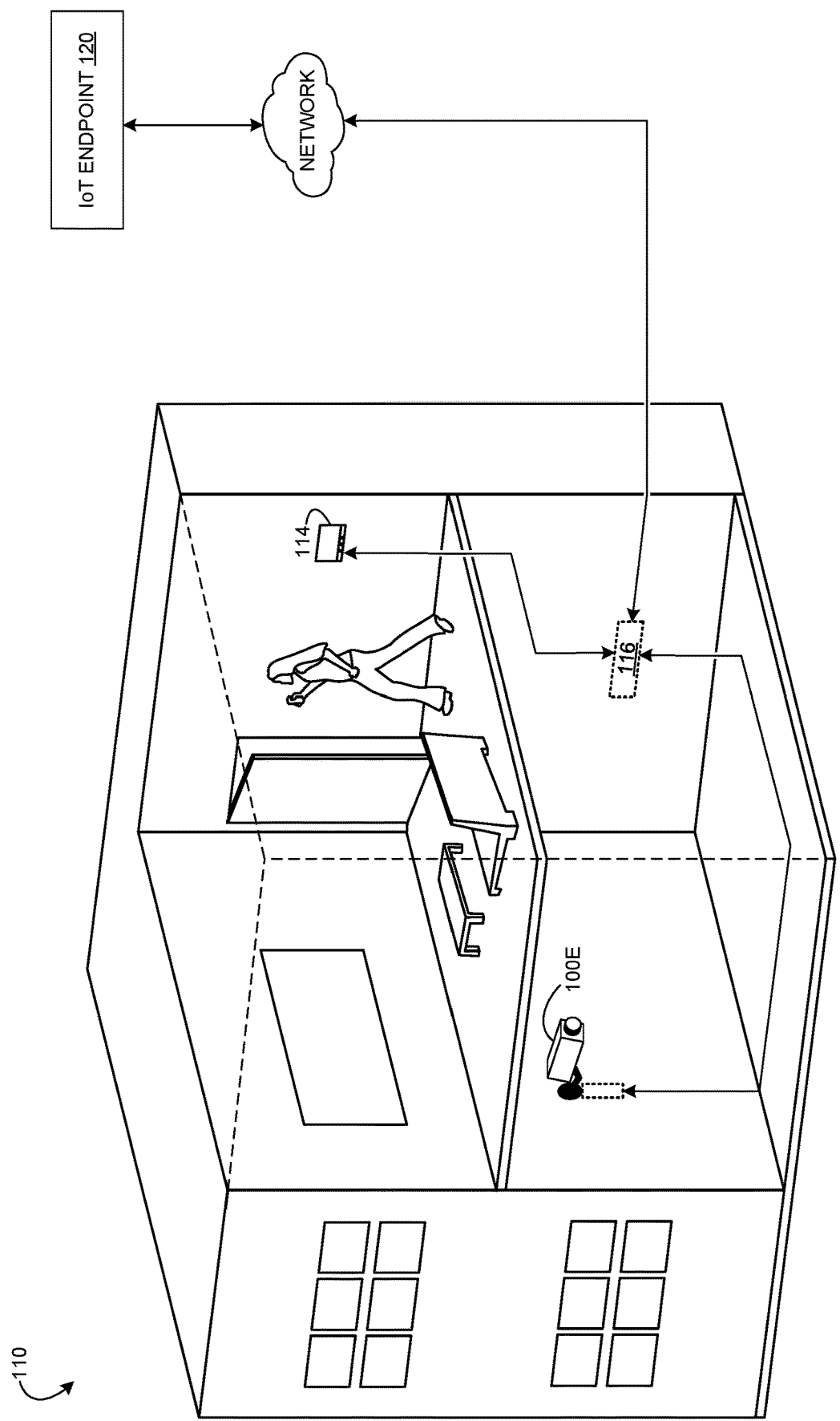

Prior to discussing these examples in detail, FIGS. 1A-1B illustrate various different example electronic devices 100A-E that may employ phase-based ToF depth ToF cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device implements a depth image processing pipeline, either as fully embedded on the device or distributed between the device and a remote computing system 104. Remote computing system 104 may comprise any suitable computing system, such as a cloud computing system, a PC, a laptop, a phone, a tablet, etc.

FIG. 1B shows an example use environment 110 including a security camera 100E comprising a ToF camera. Security camera 100E sends data to a remote computing system 120 via a communication hub 116. Communication hub 116 also connects to other IoT devices, such as a thermostat 114. In combination with communication hub 116 and/or remote computing system 120, security camera 100E may process depth image data using either a fully embedded depth image processing pipeline or a distributed depth image processing pipeline.

Figure 2:
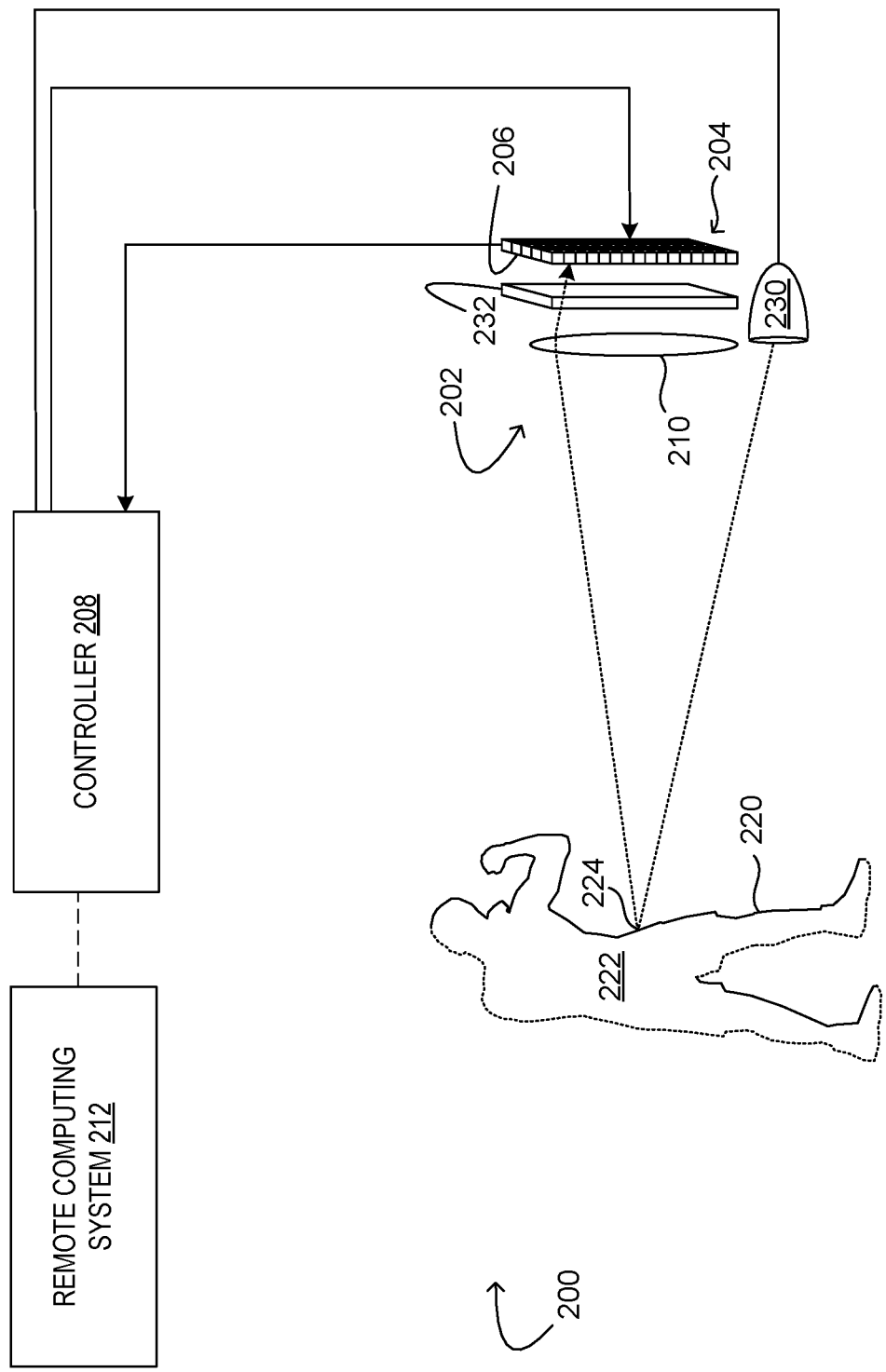
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g. software, firmware and/or hardware) to perform denoising and/or phase unwrapping, as described below. Controller 208 may be implemented across one or more computing devices. Controller 208 may communicate with a remote computing system 212 to perform depth image processing in accordance with the distributed depth image processing pipeline examples disclosed herein. Examples of hardware implementations of computing devices configured to perform phase unwrapping are described in more detail below with reference to FIG. 23.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency.

As mentioned above, due to the periodic nature of the modulated light, the measured total phase repeats (or wraps) every 2π. For example, given a measured phase $\tilde{\phi}_k$, the total phase is $\tilde{\phi}_k + 2\pi n_k$, where $n_k$ is an integer. Since $n_k$ cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. Two or more different modulation frequencies can be used to increase the unambiguity range, and the collected phase shift data is then unwrapped for the accurate determination of distance.

Figure 3:
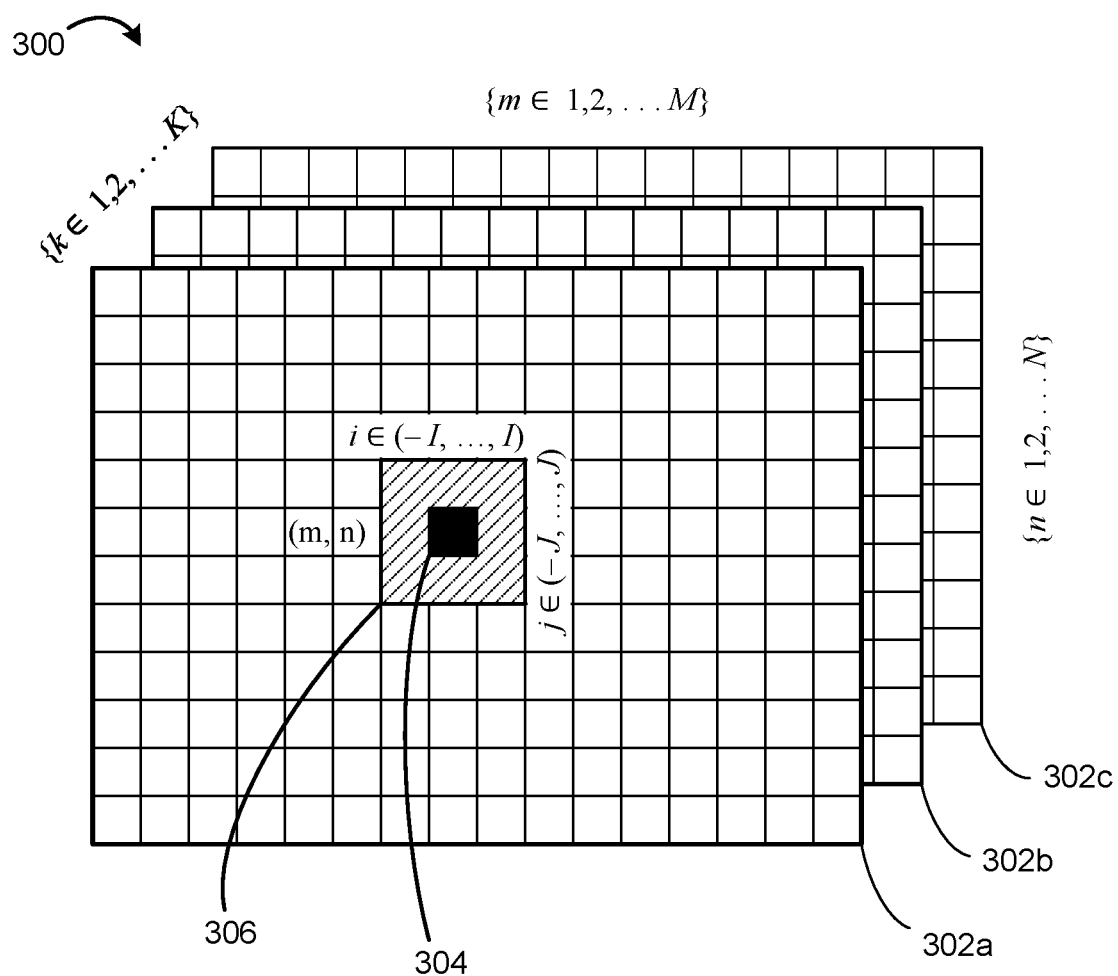
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200 during multi-frequency frame collection. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. The complex signal $\tilde{S}_k$(m, n, k) is collected by pixel 304 at (m, n) with m ∈ {1, 2 . . . , M} and n ∈ {1, 2 . . . , N} for the frequency k with k ∈ {1, 2 . . . , K}. A tilde accent over a variable indicates that the variable is obtained and/or calculated experimentally, while the absence of a tilde accent indicates variables that correspond to a noise-free situation.

Figure 4A:
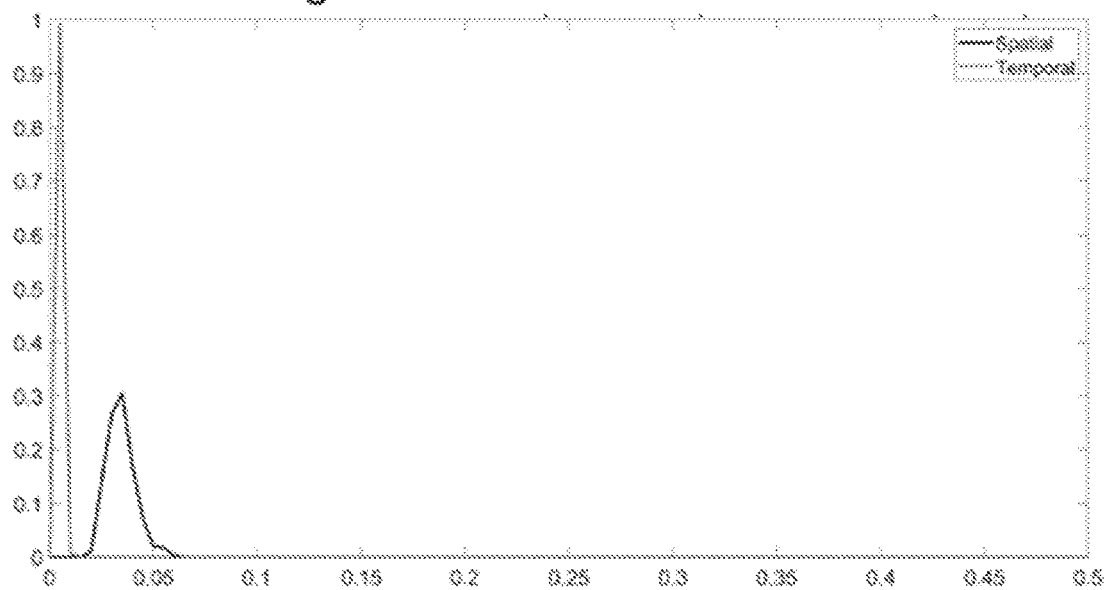
FIGS. 4A and 4B show distribution graphs of an inverse of active brightness signal-to-noise ratios for high signal and for low signal pixels at 25 Klux ambient light.
Figure 4B:
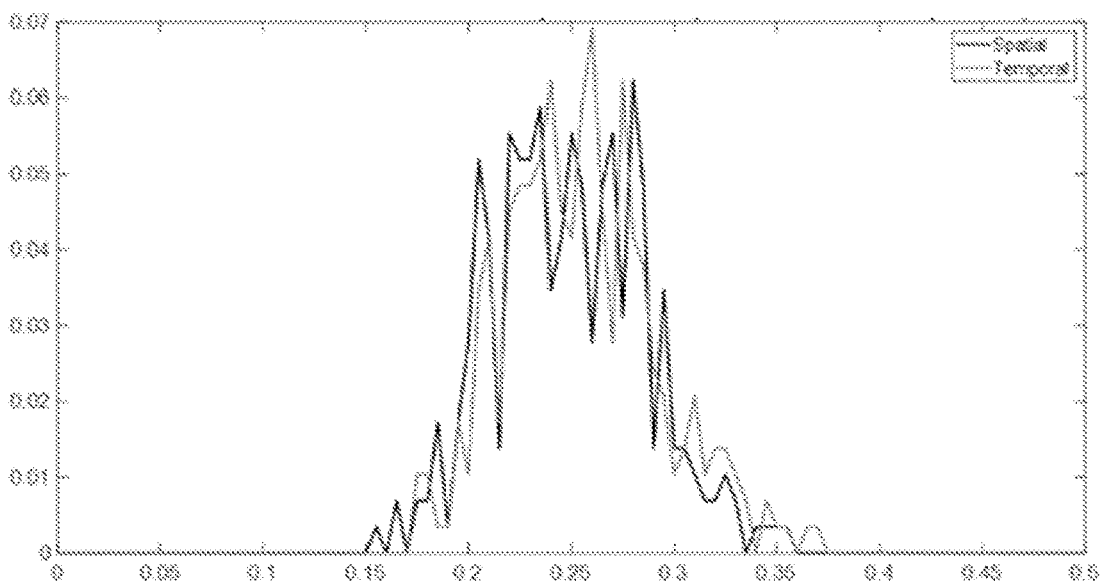

One assumption that is made in current depth data processing is that the spatial noise and temporal noise have a probability distribution that is similar. FIGS. 4A and 4B show distribution graphs of the inverse of active brightness signal-to-noise ratio for high signal at 400 and for low signal at 402, each at 25 Klux. Experimentally, FIGS. 4A and 4B show that this assumption is fulfilled in low signal, but in high signal, the inverse of the active brightness (AB) signal-to-noise ratio (SNR) distribution; are different⟩The temporal distribution is more stable and narrow, while the spatial distribution is broader and has a higher central value. When performing denoising based upon the assumption that these types of noise have similar distributions, the different distributions in the high signal regime may result in losing some spatial frequencies (depth texture) by reducing jitter more than may be needed for an application, since more smoothing would be applied.

Figure 5:
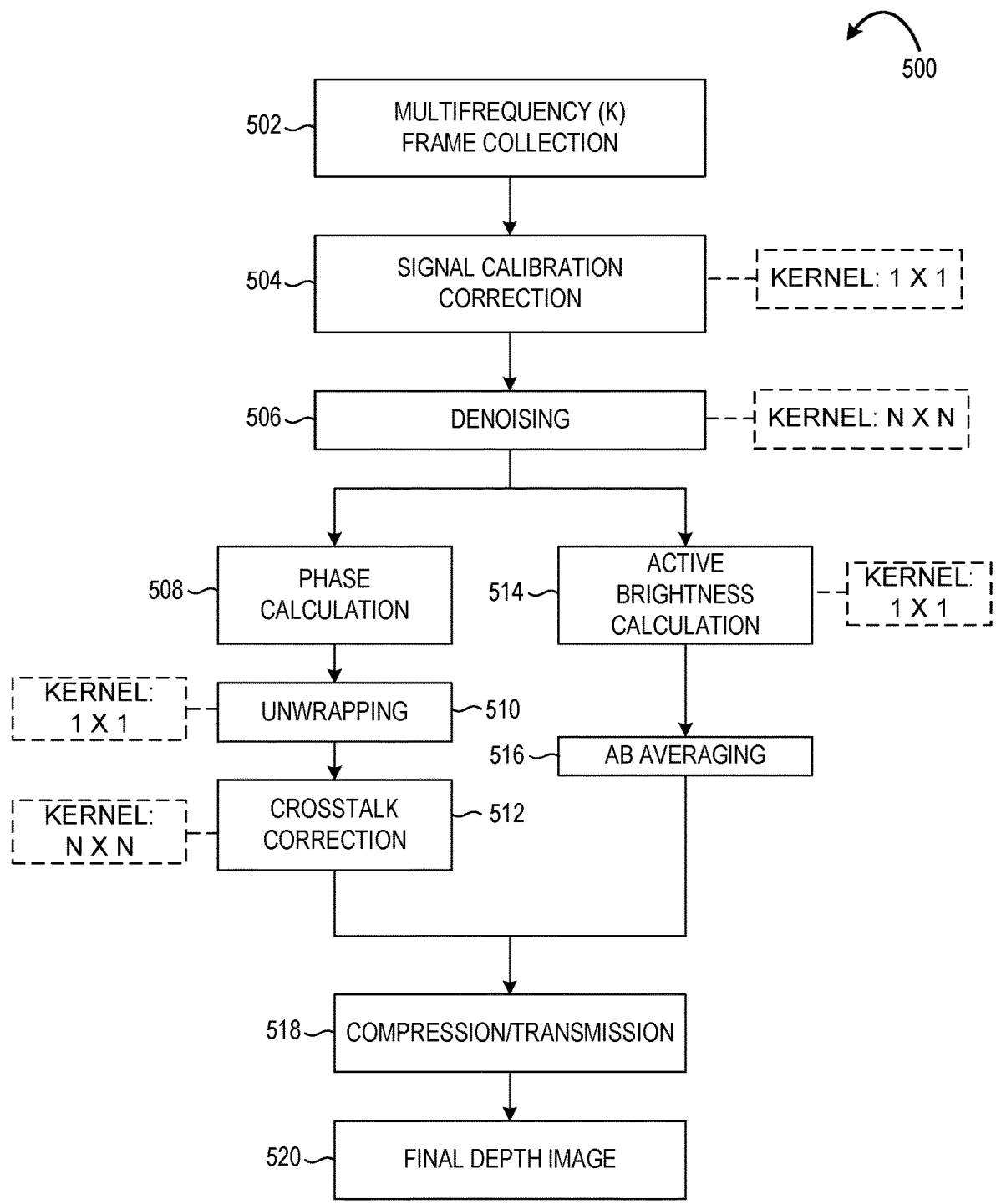
FIG. 5 shows an example embedded depth engine pipeline for processing depth image data.

As such, the examples herein apply one or more spatial noise metrics to depth data to segment (classify) the data based upon noise metric values, and then perform different denoising operations on different classifications of pixels. The metrics can be applied to any suitable form of depth image data, including complex data from which depth values are calculated (e.g. in an embedded pipeline), as well as coarse depth data calculated from noisy complex data (e.g. in a distributed pipeline). FIG. 5 shows a flow diagram depicting an example method 500 for processing ToF depth image data. Method 500 may be implemented on a depth camera, and thus may represent an example embedded depth image processing pipeline.

At 502, method 500 includes performing multifrequency frame collection, where a plurality of phase samples (each comprising a frame of image data) are collected via a ToF sensor for each of a plurality of amplitude modulation frequencies K. At 504, pixel-wise signal calibration correction is performed, and denoising using spatial noise metrics is performed on the ToF image data at 506. Denoising in the embedded depth engine pipeline will be described in more detail with regard to FIG. 6 below.

After denoising the calibrated image data, method 500 includes calculating phase information for each frequency of light at 508, and then performing phase unwrapping at 510. As discussed above, performing phase unwrapping after denoising may provide for fewer unwrapping errors for low-signal pixels. The phase unwrapping operations provide a set of phase numbers (i.e. a number of wrappings of each modulation frequency) for each pixel, which is then used to compute a depth value for each pixel. After phase unwrapping, crosstalk correction is applied at 512 to enhance edges in a depth image between different distances. The denoised calibrated image data may also be used to calculate active brightness data at 514, then pixel-wise AB averaging is performed at 516 to generate an active brightness image. Compression/transmission may be performed at 518 to provide a final depth image 520 to any recipient applications and/or services. In some examples, the depth image is output together with the active brightness image. The final images may be output, for example, to software applications on a remote computing system, to a device incorporating the ToF camera, or to a cloud computing system.

Figure 6:
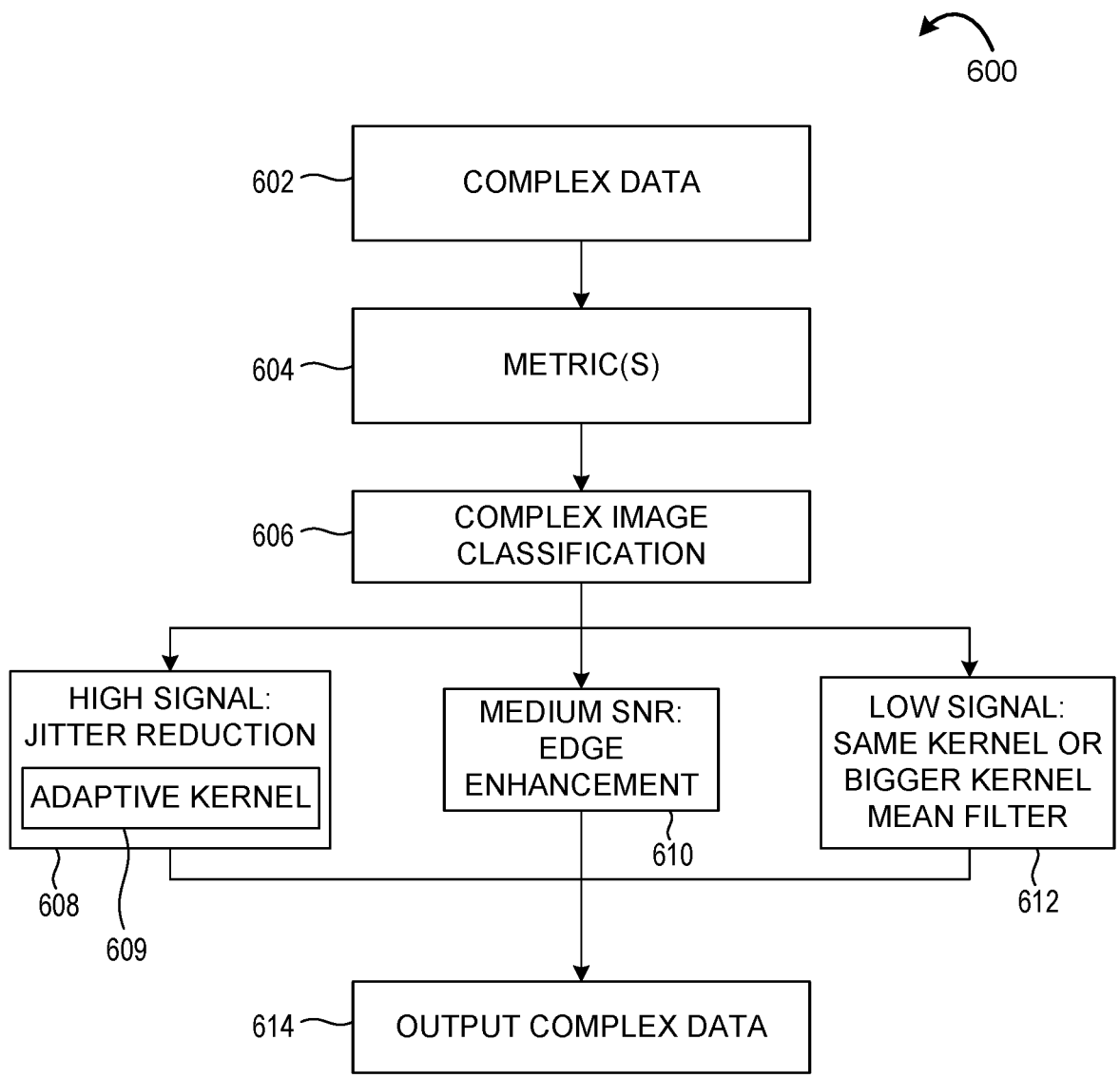
FIG. 6 shows an example method for denoising complex domain depth data in an embedded depth engine pipeline.

FIG. 6 shows an example method 600 for denoising depth image data in an embedded depth engine pipeline using spatial noise metrics. Method 600 is an example of denoising block 506 of FIG. 5. Method 600 comprises receiving complex domain depth image data at 602, and calculating one or more spatial noise metrics using the complex domain depth image data, at 604.

Any suitable spatial noise metrics may be computed. One example metric is based on the square of the degree of coherence in optics, considering the complex signal $\tilde{S}_k$(m, n, k) of the pixel as a plane wave (Euler form), or in a broader sense in the Cauchy-Schwarz inequality. Since the complex signal of every pixel can be seen as a 2D vector, then every pixel under test (m, n) and its surroundings (i, j) fulfills Equation 1.

$$| \tilde{S}(m,n,k) \cdot \tilde{S}(i,j,k) |^2 \leq \|\tilde{S}(m,n,k)\|^2 \|\tilde{S}(i,j,k)\|^2 \quad \text{Eq 1}$$

Then, the square of the degree of coherence can be written as Equation 2.

$$\gamma^2(m, n; i, j) = \frac{|(\tilde{S}(m, n, k) \cdot \tilde{S}(i, j, k))|^2}{\|\tilde{S}(m, n, k)\|^2 \|\tilde{S}(i, j, k)\|^2} \text{ with } \gamma^2 \in [0,1] \quad \text{Eq 2}$$

The proposed metric $\overline{\gamma}^2$, referred to herein as the "Cauchy-Shwarz metric," is the average of the square of the degrees of coherence, as shown in Equation 3.

$$\overline{\gamma}^2(m, n) = \frac{1}{(2I+1)(2J+1)} \sum_{i=-I}^{I} \sum_{j=-J}^{J} \gamma^2(m, n; i, j) \quad \text{Eq 3}$$

Figure 7A:
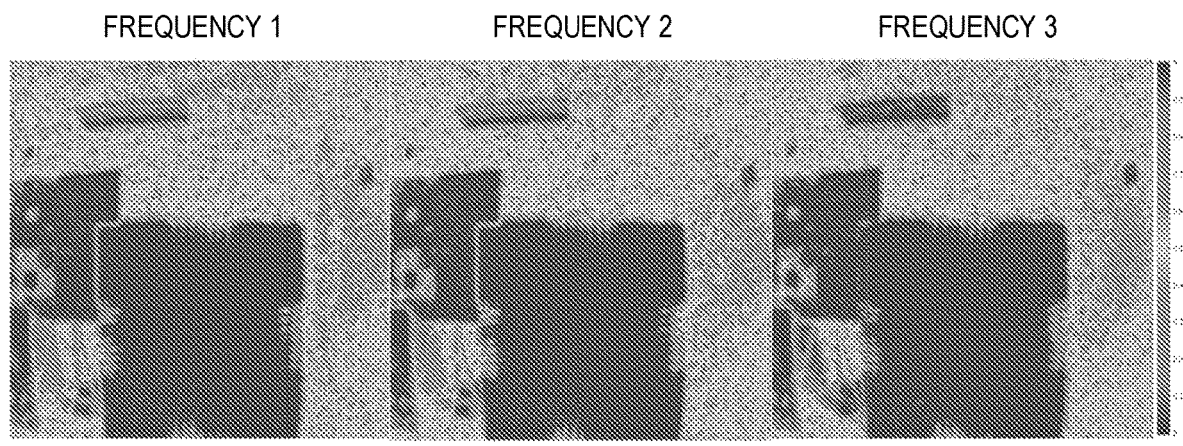
FIG. 7A shows example depth images for a sample scene obtained after denoising using a Cauchy-Shwarz metric.
Figure 7B:
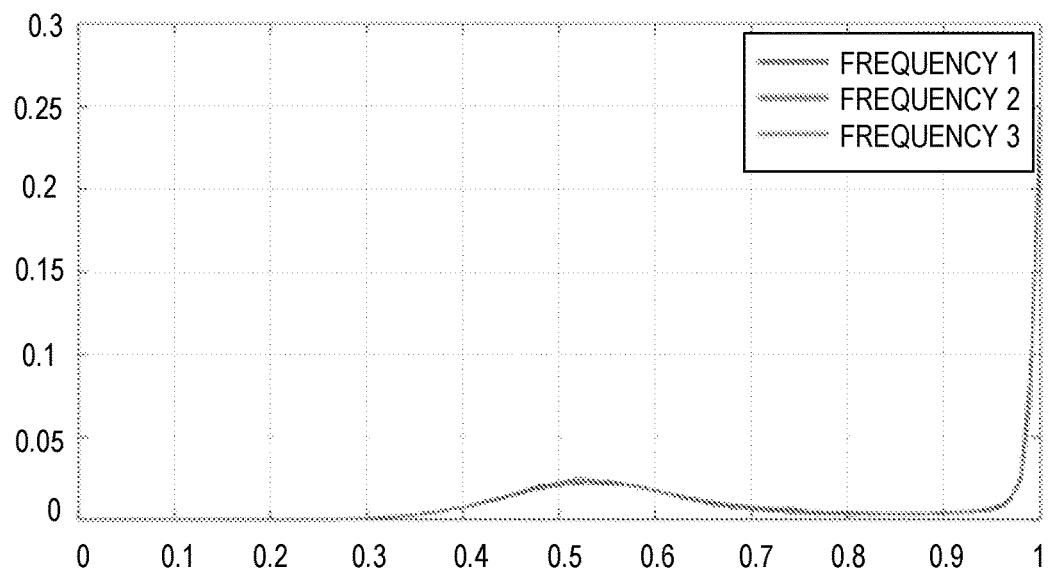
FIG. 7B shows a corresponding histogram.

FIG. 7A shows, for a sample scene, example depth images for each of three frequencies resulting from processing depth image data and applying the Cauchy-Shwarz metric, and FIG. 7B shows a corresponding histogram plot of the distribution of the Cauchy-Shwarz metric. FIGS. 7A and 7B show that the Cauchy-Shwarz metric is able to distinguish between low signal and high signal, forming a bimodal plot with two peaks. The term "low signal" represents pixels in the lower signal peak centered approximately at 0.55 in the histogram of FIG. 7B, whereas low signal pixels are represented by the sharper peak centered about approximately 0.95 in the histogram. As such, the terms "low signal" and "high signal" as used herein are relative to one another, and do not represent any particular noise metric values.

A second example metric is based on the Minkowski inequality, as shown in Equation 4.

$$\|\tilde{S}(m,n,k)+\tilde{S}(i,j,k)\|^2 \leq \|\tilde{S}(m,n,k)\|^2+\|\tilde{S}(i,j,k)\|^2 \quad \text{Eq 4}$$

Based on Equation 4, a coefficient can be calculated as shown in Equation 5.

$$\beta(m,n;i,j) = \frac{\|\tilde{S}(m,n,k)+\tilde{S}(i,j,k)\|^2}{\|\tilde{S}(m,n,k)\|^2+\|\tilde{S}(i,j,k)\|^2} \beta \in [0,1] \quad \text{Eq 5}$$

The metric $\beta$, referred to herein as the "Minkowski metric," can be defined as the average of the coefficients inside the kernel, as shown in Equation 6.

$$\bar{\beta}(m,n) = \frac{1}{(2I+1)(2J+1)} \sum_{i=-I}^{I} \sum_{j=-J}^{J} \beta(m,n;i,j) \quad \text{Eq 6}$$

Figure 8A:
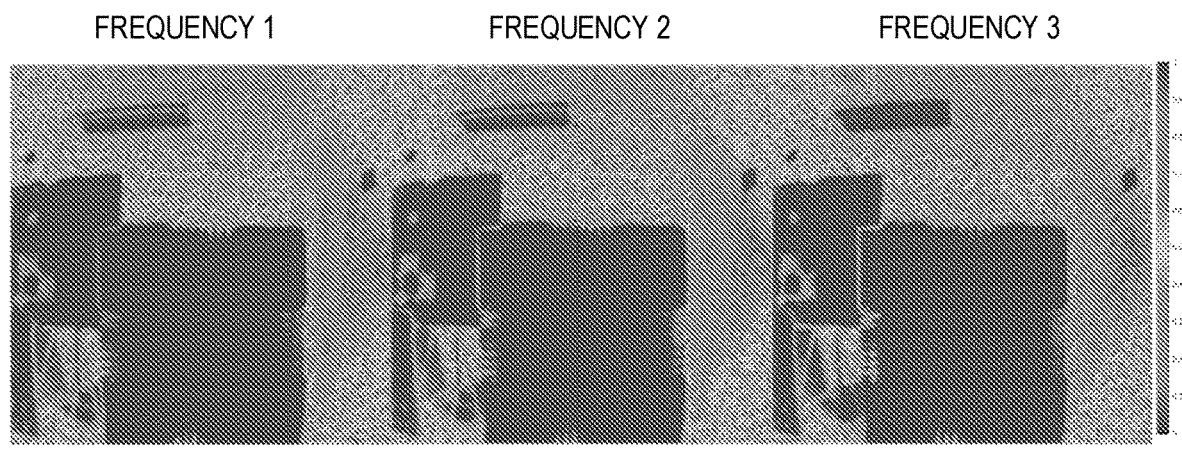
FIG. 8A shows example depth images for a sample scene obtained after denoising using a Minkowski metric.
Figure 8B:
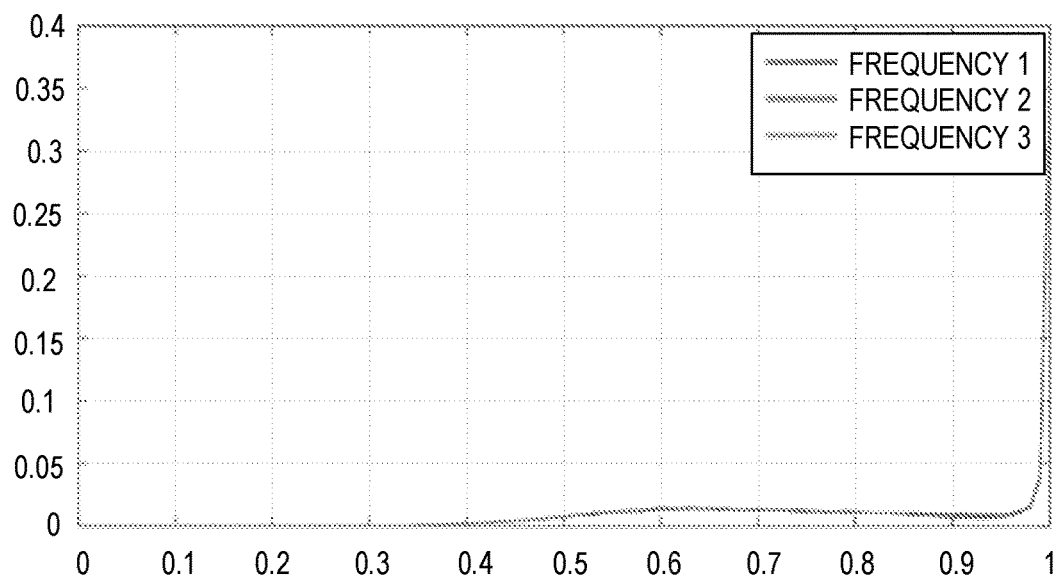
FIG. 8B shows a corresponding histogram.

FIG. 8A shows, for a sample scene, example depth images for each of three frequencies resulting from processing depth image data and applying the Minkowski metric, and FIG. 8B shows a corresponding histogram plot of the distribution of the Minkowski metric. As with the Cauchy-Shwarz metric, the Minkowski metric is able to distinguish between low signal and high signal. However, the low signal peak for this metric is broader and flatter than with the Cauchy-Shwarz metric.

A third example metric is referred to herein as the "squared cosine metric." The coefficients can be calculated as shown in Equation 7.

$$\alpha(m,n;i,j) = 1 - \frac{\|\tilde{S}(m,n,k)-\tilde{S}(i,j,k)\|^2}{\|\tilde{S}(m,n,k)\|^2+\|\tilde{S}(i,j,k)\|^2}, \quad \text{Eq 7}$$

with $\alpha \in [-1,1]$

The squared cosine metric $\bar{\alpha}^2$ can be defined as shown in Equation 8.

$$\bar{\alpha}^2(m,n) = \frac{1}{(2I+1)(2J+1)} \sum_{i=-I}^{I} \sum_{j=-J}^{J} \alpha^2(m,n;i,j) \quad \text{Eq 8}$$

Figure 9A:
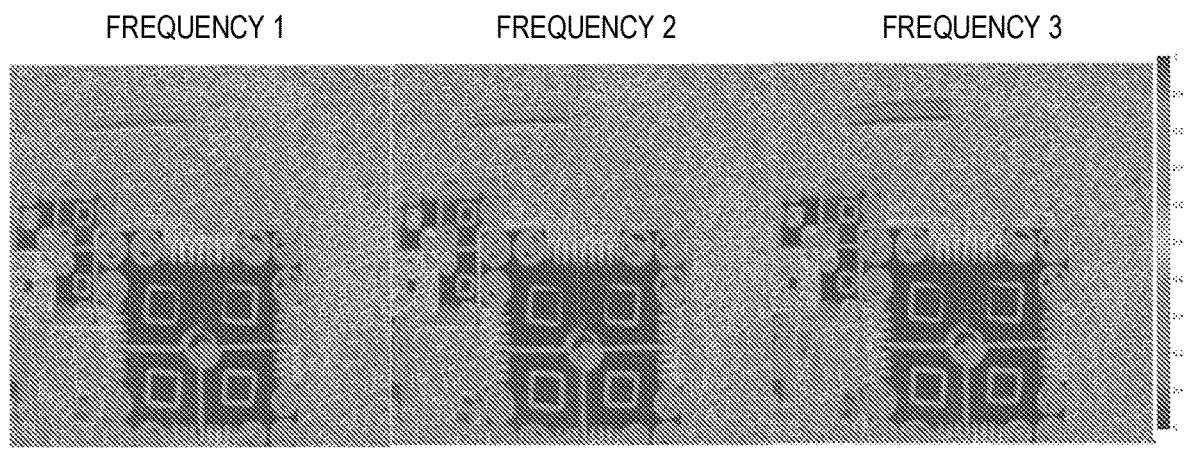
FIG. 9A shows example depth images for a sample scene obtained after denoising using a squared cosine metric.
Figure 9B:
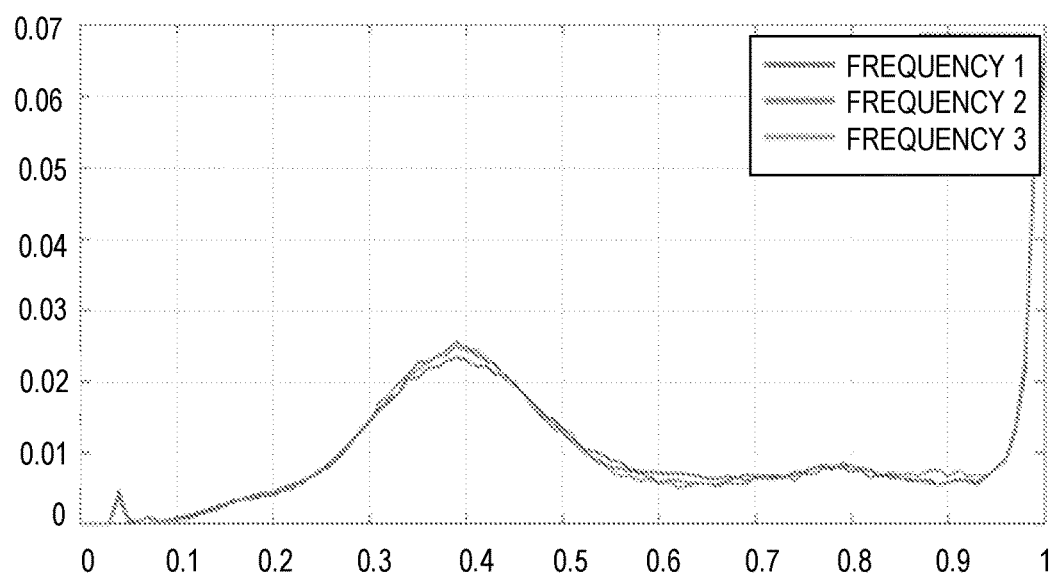
FIG. 9B shows a corresponding histogram.

FIG. 9A shows example depth images for each of three frequencies resulting from processing depth image data and applying a noise metric based on squared cosine, and FIG. 9B shows a corresponding histogram plot of the distribution of the squared cosine metric. As represented in FIG. 9B, the squared cosine metric also can distinguish low signal (at about 0.4 in the histogram), high signal (at about 1). Further, the squared cosine metric also helps to distinguish edge regions (at about 0.8) more efficiently compared to the Cauchy-Shwarz and Minkowski metrics. Thus, the squared cosine metric may help to classify complex depth data into low signal, high signal, and edge (medium signal) classifications. It will be understood that the above metrics are provided for the purpose of example, and that any other suitable noise metric may be calculated and used, alone or in combination with other metrics.

Returning to FIG. 6, once the metrics are calculated, the complex domain image pixels are classified at 606. The one or more metrics are used as a predictor of noise in order to calculate an amount of blur that may be applied to meet a target requested by an application or user. As examples, pixels may be classified as high signal 608, medium signal 610 (corresponding to edge pixels), and low signal 612 (e.g. using the squared cosine metric). Based upon these classifications, different denoising processes may be performed on differently classified pixels. For example, at 608, jitter reduction operations may be performed on high-signal data. In some examples, an adaptive denoising kernel may be used for jitter reduction, at 609, as described in more detail below. Further, at 610, edge enhancement operations may be performed on edge regions. In some examples, no noise reduction is performed on pixels classified as edge pixels at this stage in processing, as later processing steps (e.g. crosstalk correction after phase unwrapping) can be used for edge enhancement. Additionally, at 612, denoising operations, using the same or relatively larger convolutional fixed kernel (as opposed to an adaptive kernel) compared to jitter reduction and edge enhancement operations, are performed on low-signal data. Thus, segmentation may help allocate heavy compute resources for low-signal data. In the example depicted in FIG. 6, high signal areas determined by the metric(s) may be weighted using a Gaussian filter with smoothing parameters depending on the local depth of the standard deviation. Then, denoising method 600 includes outputting the complex data at 614 for further processing. It will be understood that method 600 may be performed for data collected for each of a plurality of amplitude modulation frequencies prior to performing phase unwrapping.

Figure 10:
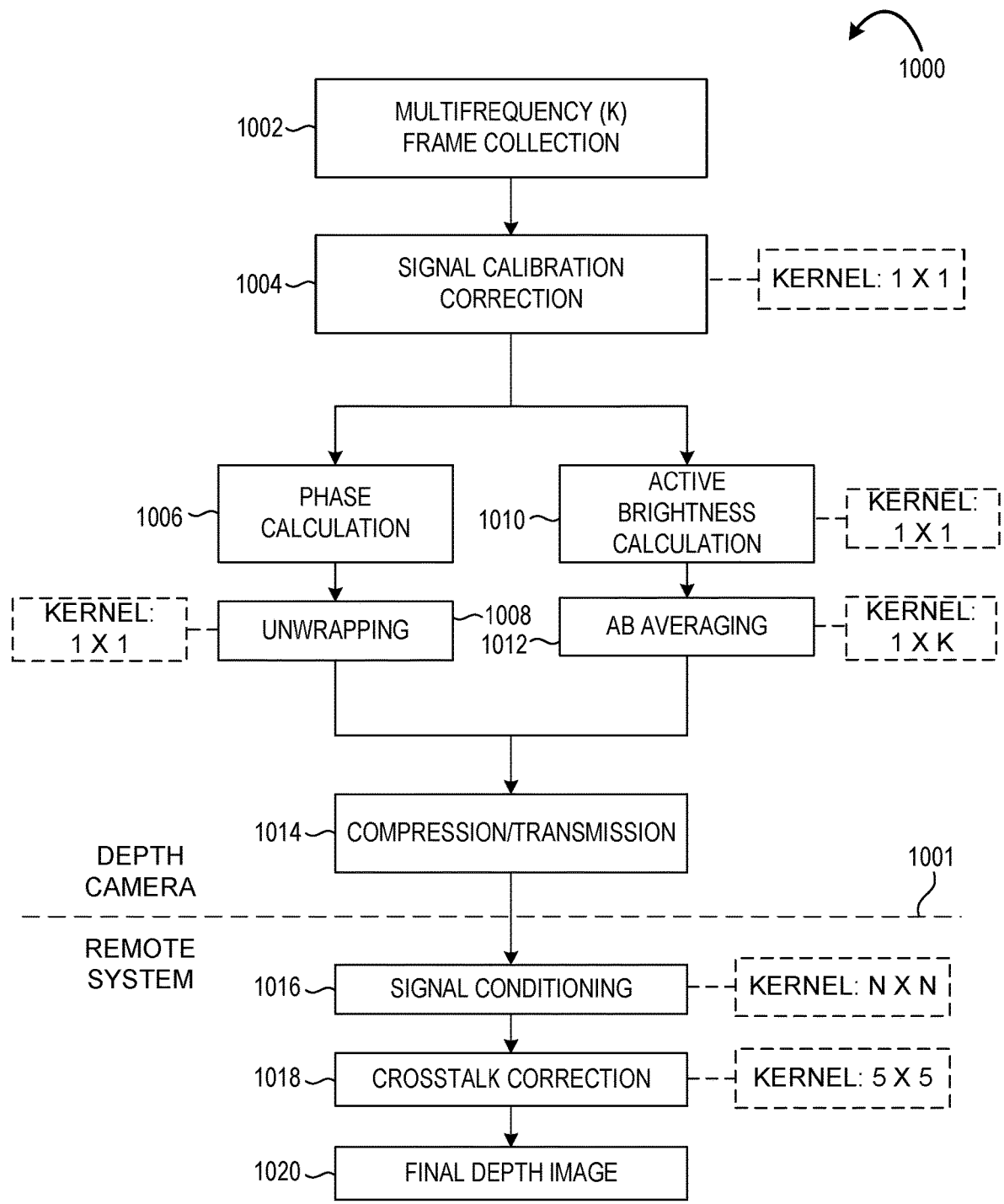
FIG. 10 shows an example distributed depth engine pipeline for processing depth image data.

In the embedded pipeline of FIG. 5, only complex data for each light modulation frequency is available at denoising phase 506 for computing spatial noise metrics. In contrast, in a distributed pipeline, denoising may be performed remotely from a depth camera module after computation of a coarse depth image by the depth camera module. As such, the coarse depth image can be used for spatial noise metric computation in a distributed pipeline. FIG. 10 shows a flow diagram depicting an example method 1000 for processing ToF depth image data. Method 1000 represents an example distributed depth engine pipeline. In this example, the procedures above dashed line 1001 are performed by processing on a depth camera module, while procedures below the line are performed by processing remote to the depth camera module (e.g. by a device incorporating the depth camera module, or by a device remote to the depth camera module, such as a network-accessible computing device to which the depth camera module sends coarse depth images). Method 1000 allows all processing performed on the camera to be pixel-wise, as it places extended kernel computations on the remote computing device.

Method 1000 comprises, at 1002, performing multifrequency frame collection, where a plurality of phase samples (each comprising a frame of image data) are collected via a ToF sensor for each of a plurality of amplitude modulation frequencies K. At 1004, pixel-wise signal calibration correction is performed. At 1006, method 1000 comprises calculating complex phase data from the phase samples, and then at 1008, performing phase unwrapping. Note that denoising is not performed on the complex phase data in method 100. The phase unwrapping operations provide a set of phase numbers (i.e. a number of wrappings of each modulation frequency) for each pixel, which is then used to compute a depth value for each pixel. As a result of the phase unwrapping, a coarse depth image is produced, wherein "coarse" indicates that noisy complex phase data was used for phase unwrapping. The calibrated image data also may be used to produce an AB image, at 1010, then AB averaging operations are performed to generate the active brightness image, at 1012. As shown, all operations on above line 1001 are pixel-wise.

The coarse depth image and active brightness image are optionally compressed, and then transmitted to a remote computing system at 1014. At the remote computing device, method 100 comprises performing signal conditioning at 1016 using spatial noise metrics for classification followed by denoising, as described in more detail below. Next, crosstalk correction is applied at 1018. A final depth image is output at 1020. In some examples, the depth image is output together with the active brightness image.

Two example approaches for signal conditioning 1016 are described below. A first example approach performs denoising purely in the complex domain, and a second example approach performs denoising in the depth domain or the complex domain depending upon pixel classification.

Figure 11:
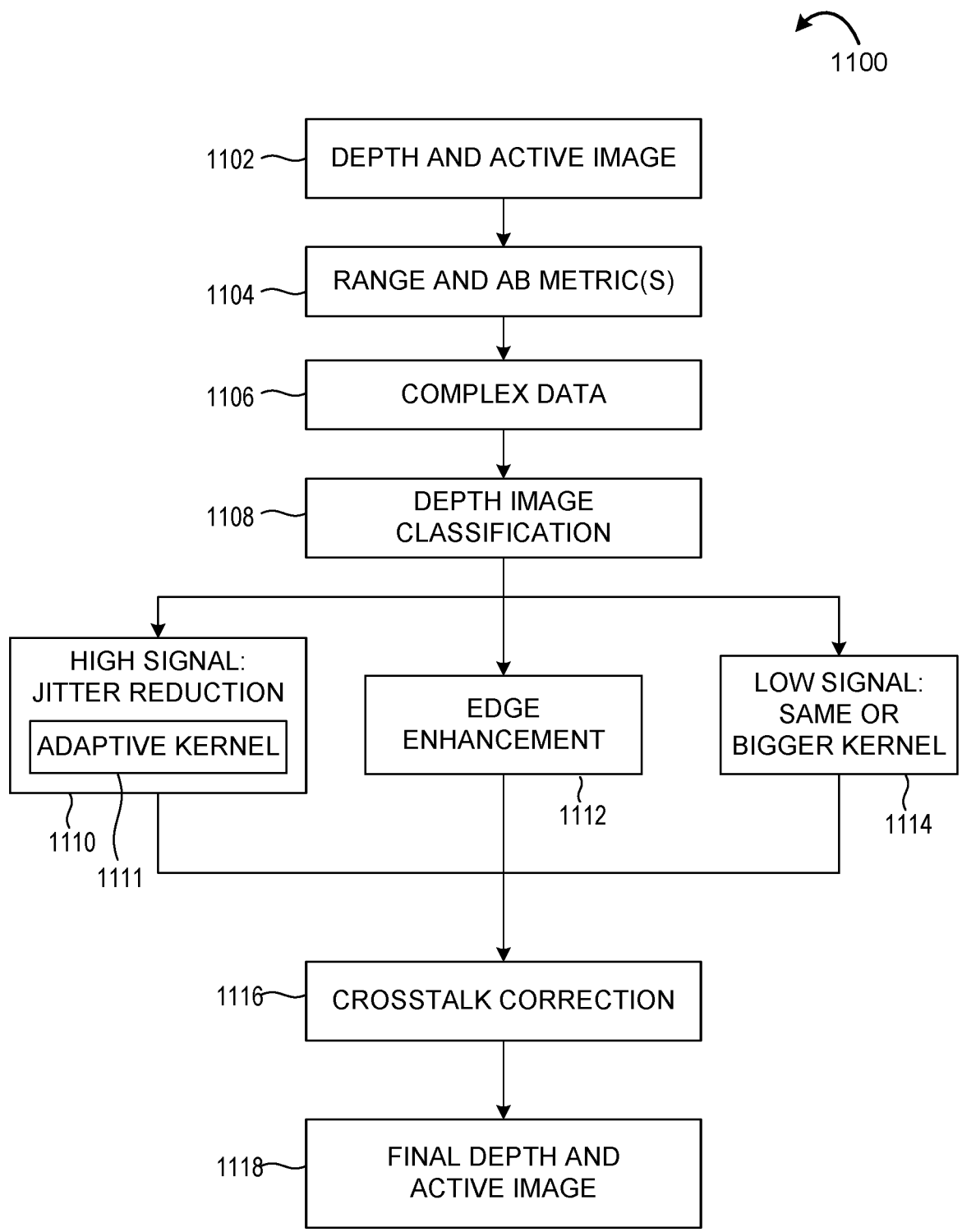
FIG. 11 shows an example method for denoising depth data in a distributed depth engine pipeline.

First, FIG. 11 shows method 1100 for performing complex domain processing. At 1102, method 1100 includes receiving coarse depth image data and active brightness image data, e.g. from a depth camera module. The coarse depth image data comprises depth values for each pixel corresponding to unwrapped noisy phase data. At 1104, spatial noise metrics are computed from the coarse depth and/or active brightness images. Example spatial noise metrics are described in further detail below. Next, complex phase data is generated at 1106 using the active brightness and coarse depth data. The complex phase data may be reconstructed using the set of light modulation frequencies used to collect the data, and/or using virtual frequencies (frequencies other than those used for data collection). For example, a set of virtual frequencies may be chosen to produce a more noise resilient solution by optimizing the area, volume, or hypervolume of the Voronoi cell determined by the frequencies. The complex phase data is then classified at 1108 using the metrics previously computed.

The noise metrics used in a distributed depth engine pipeline may be the same as or different than those used in an embedded depth engine pipeline. Consider the Active Brightness ($\overline{AB}$(m, n)) and Depth ($\tilde{D}$(m, n)) of the pixel (m, n) with m ∈ {1, 2, ... M} and n ∈ {1, 2, ... N}, and its surroundings (kernel) i ∈ {−I, . . . , I}, and j ∈ {−J, . . . , J} (see FIG. 3). The depth and AB images, and the standard deviation, variance and average of the AB and depth can be used to determine four metrics: coefficients of variation for AB and depth, and coefficients of dispersion for AB and depth, see Equation 9.

$$\begin{cases} \frac{\sigma_{AB}(m, n)}{\overline{AB}(m, n)} & \frac{\sigma_{AB}^2(m, n)}{\overline{AB}(m, n)} \\ \frac{\sigma_D^2(m, n)}{\overline{D}(m, n)} & \frac{\sigma_D(m, n)}{\overline{D}(m, n)} \end{cases} \forall i, j \quad \text{Equation 9}$$

In Equation 9, $\overline{AB}$(m, n, k), and $\overline{D}$(m, n, k), are the average of the values in the kernel, and $\sigma_D$(m, n, k), and $\sigma_{AB}$(m, n, k) are the standard deviation of the signal of the kernel, and $\sigma_{AB}^2$, $\sigma_D^2$ are the variances. The coefficient of variation, defined as the standard deviation of the kernel over the average value of the population, is a non-dimensional quantity that provides the variability in relation to the mean of the population. Thus, when the data in the kernel is highly variable with respect to the mean signal, this can be translated as an edge region in the case of AB, or unwrapping errors in the case of depth. The coefficient of dispersion, defined as the variance of the population over the average, is a dimensional amount and therefore a non-scale invariant quantity that provides an idea of how clustered the data are with respect to the mean value. Thus, a coefficient of dispersion value over 1 indicates an edge region in the case of AB, or unwrapping errors in the case of the depth. It will be understood that the above metrics are provided for the purpose of example, and that any other suitable noise metric or combination of metrics may be used.

As with the embedded pipeline of FIG. 6, different operations are preformed on differently classified pixels in FIG. 11. For example, at 1110, jitter reduction operations are performed on high-signal data in the complex domain. In some examples, an adaptive kernel is applied for jitter reduction, at 1111, as described in more detail below. In such examples, the calculated metric may be used to determine the convolution coefficients and/or weighting values used in denoising.

At 1112, edge enhancement operations are performed on edge regions. As mentioned above, in some examples no denoising processing is applied to edge regions at this stage, as crosstalk correction performed at a later stage enhances edge regions. Further, at 1114, denoising operations are performed on low-signal data in the complex domain, where a larger kernel can be used to help increase a probability of unwrapping correctly. Next, as mentioned above, crosstalk correction is performed at 1116 to enhance edge pixels. Final depth and active brightness images are output at 1118.

Figure 12:
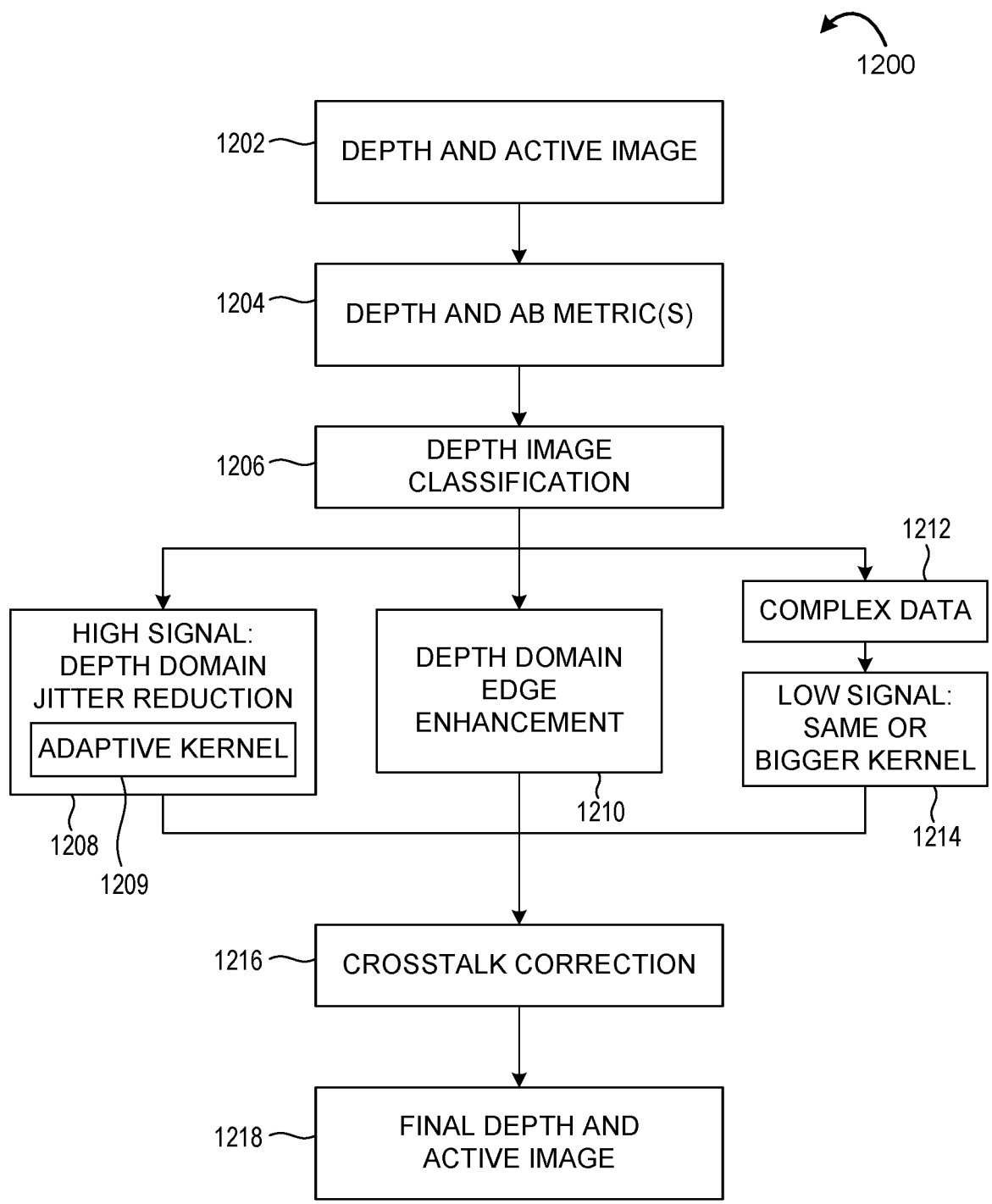
FIG. 12 shows another example method for denoising depth data in a distributed depth engine pipeline.
Figure 13A:
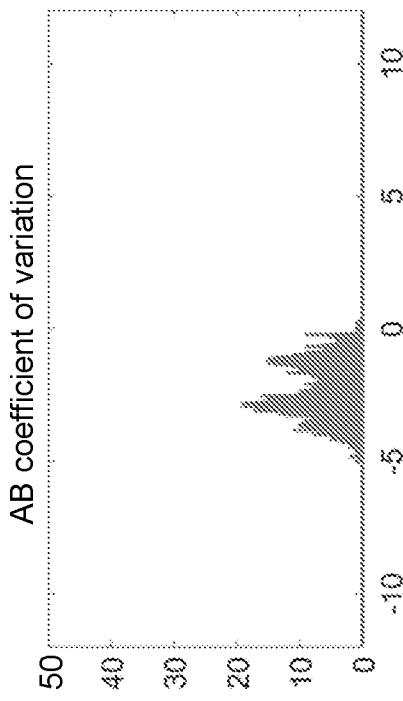
FIG. 13A shows an example depth image for a sample scene obtained after denoising using tan active brightness (AB) coefficient of variation metric.
Figure 14A:
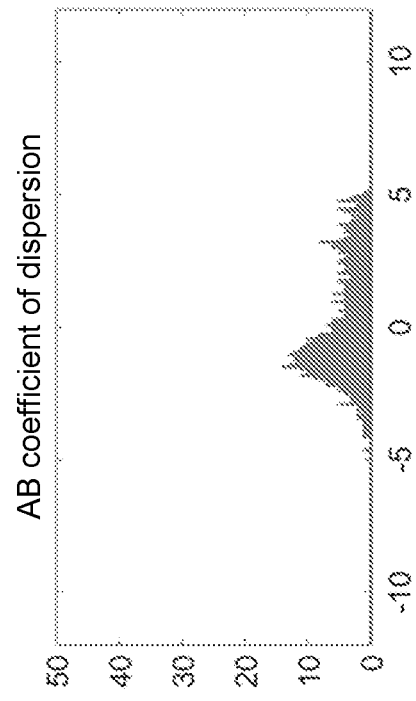
FIG. 14A show an example depth image for a sample scene obtained after denoising using an AB coefficient of dispersion metric.
Figure 13B:
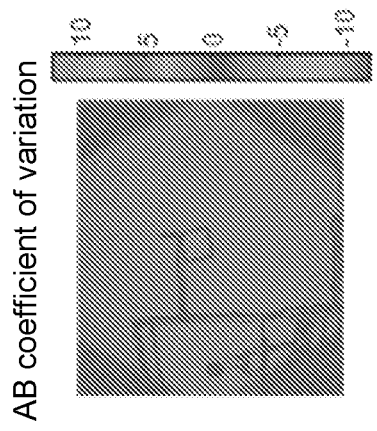
FIG. 13B shows a corresponding histogram.
Figure 14B:
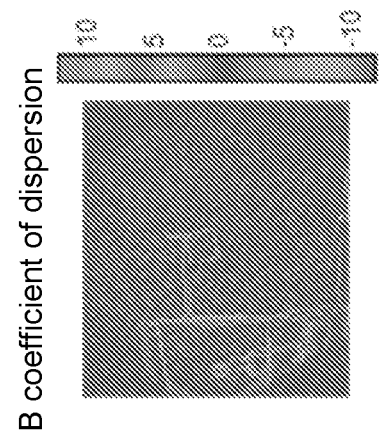
FIG. 14B shows a corresponding histogram.
Figure 15B:
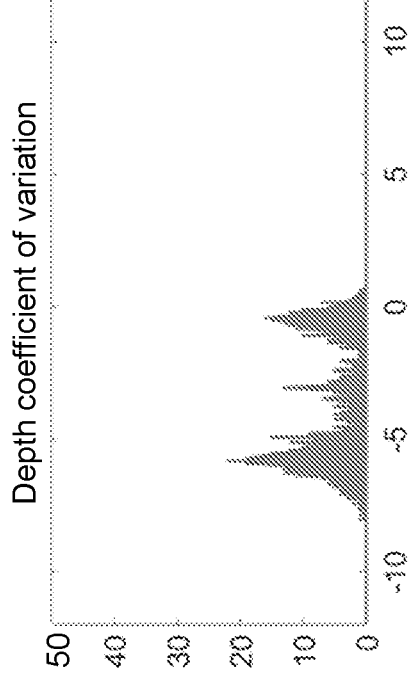
FIG. 15B shows a corresponding histogram.
Figure 16B:
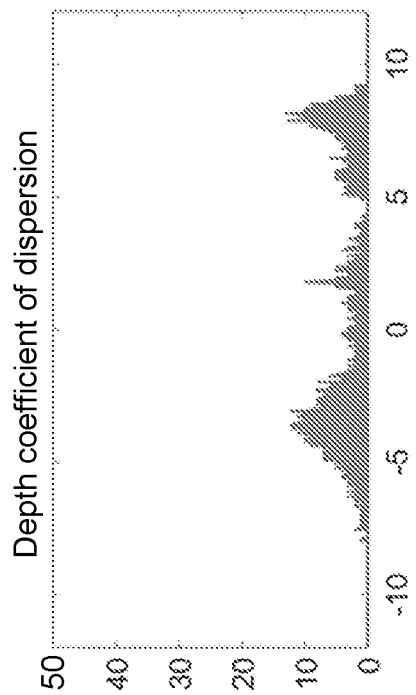
FIG. 16B shows a corresponding histogram.
Figure 15A:
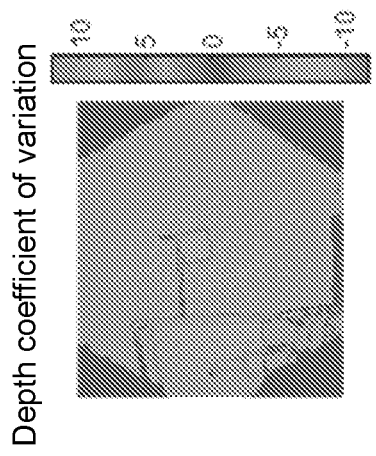
FIG. 15A show an example depth image for a sample scene obtained after denoising using a depth coefficient of variation metric.
Figure 16A:
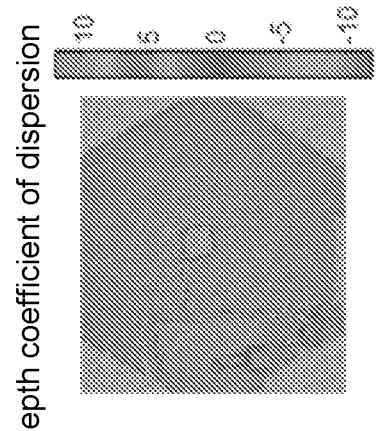
FIG. 16A show an example depth image for a sample scene obtained after denoising using a depth coefficient of dispersion metric.

FIG. 12 shows an example denoising pipeline 1200 for performing a combination of depth domain and complex domain processing on coarse depth images received from a depth camera. Coarse depth and active brightness images are received at 1202. Then, at 1204, coarse depth and active brightness metric(s) are calculated, as described above with regard to FIG. 11. Once the metrics are calculated, the depth image is classified based upon the metric at 1206.

Image areas may be classified as high signal, medium signal (e.g. edge regions), and low signal, as described above. For high-signal pixels, jitter reduction operations are performed on depth domain data at 1208. In some examples, an adaptive kernel is applied for jitter reduction, at 1209, as described in more detail below. For edge regions, edge enhancement operations are performed on depth domain data at 1210. As mentioned above, in some examples, no denoising is performed on medium signal pixels at this stage, as crosstalk correction performed later can effectively enhance edge pixels.

Continuing, at 1212, complex domain data is reconstructed from the coarse depth data. The complex data may be reconstructed using the set of frequencies used to collect the data, or different virtual frequencies, as described above. Then, at 1214, denoising operations are performed on complex domain data of low-signal pixels. As before, a larger kernel can be used to help increase a probability of unwrapping correctly. Finally, crosstalk correction operations are performed at 1216 and the final depth and active brightness images are output at 1218.

FIGS. 13A-B, 14A-B, 15A-B and 16A-B show example depth images for a sample scene obtained by denoising each using one of the above-described metrics for the distributed pipeline, and show corresponding histogram plots of the distribution for the metric (AB coefficient of variation, AB coefficient of dispersion, depth coefficient of variation, and depth coefficient of dispersion, respectively). For these example data, a kernel of 3×3 was used. These example metrics resulted in relatively good edge detection. The coefficients of dispersion for AB and depth resulted in relatively more widespread histograms.

As mentioned above, in some examples, an adaptive spatial denoising kernel may be applied when performing jitter reduction based upon the spatial noise metrics determined for depth pixels (whether complex domain or coarse depth domain). In this manner, an amount of jitter reduction can be precisely varied to achieve a target signal to noise ratio on a pixel-by-pixel basis. The applied adaptive spatial denoising kernel may comprise parameters selected for each pixel based upon determining the one or more noise metrics such that different denoising kernels are applied to different pixels. As one example, jitter reduction may be performed by Gaussian blurring, which generates coefficients radially distributed and spatially dependent according to Equation 10, where $\lambda$ is a parameter responsible for the smoothing.

$$e^{-\lambda(\rho)(i^2+j^2)} \text{ with } \begin{cases} i = -I, -I+1, \ldots, I \\ j = -J, -J+1, \ldots, J \end{cases} \quad \text{Equation 10}$$

Figures 17A, 17B, 17C:
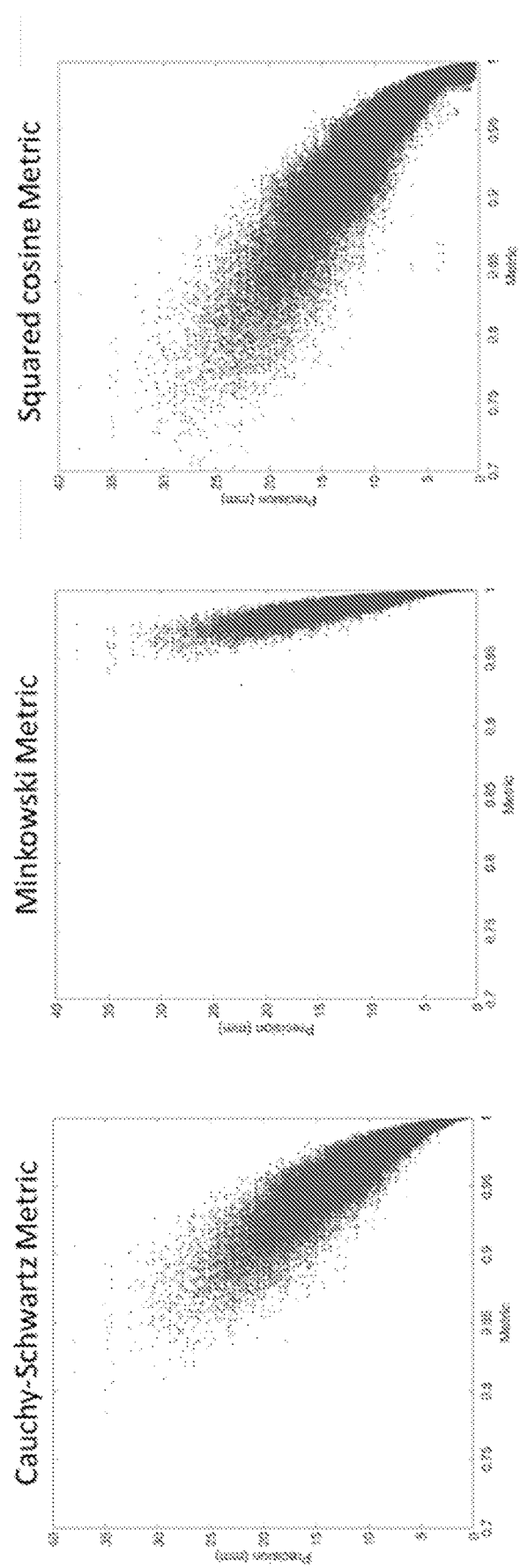
FIGS. 17A-17C show example plots illustrating a relationship between each of three example metrics and jitter, fitted to functions, from results of an experiment imaging a flat wall.

In an example experiment, a collection of measurements of a flat wall ranging from 300 to 4500 mm in distance from a depth camera was used. FIGS. 17A-C show plots of the relationship between each of the Cauchy-Shwarz metric, Minkowski metric, and squared cosine metric and the jitter, fitted to functions, from this experiment. The Cauchy-Shwarz metric and the squared cosine metric data were fitted to exponential functions, and the Minkowski metric data was fitted to a four-degree polynomial, as represented below in Equation 11. As can be seen, the degree of coherence of the Cauchy-Shwarz metric and the Minkowski metric provide a smaller range than the squared cosine metric.

$$\text{Precision predictor} \begin{cases} ae^{-bx} + ce^{-dx} \\ ax^4 + bx^3 + cx^2 + dx + e \end{cases} \quad \text{Equation 11}$$

Table 1 shows the values of the precision predictor f(x) for the three metrics.

TABLE 1

Values of precision predictor for Cauchy-Shwarz, Minkowski, and squared cosine metrics.

| f(x) | a | b | c | d | e | $R^2$ |
|---|---|---|---|---|---|---|
| C-S | 66.18 | −1.21 | $-7.62 \cdot 10^{-9}$ | 21.59 | — | 0.94 |
| Minkowski | $-7.84 \cdot 10^7$ | $3.07 \cdot 10^8$ | $-4.52 \cdot 10^8$ | $2.95 \cdot 10^8$ | $-7.22 \cdot 10^7$ | 0.98 |
| Squared cosine | 223 | −2.91 | $-1.35 \cdot 10^{-8}$ | 20.54 | — | 0.94 |

The precision, or "jitter," may be controlled and stabilized by making the smoothing coefficient dependent on the ratio $\rho$, as shown in Equation 12, between the noise target ($\Delta_T^\zeta$) and the variability of the depth without any filtering ($\Delta_O^\zeta$) within the kernel (i, j), with $\zeta$ denoting either the standard deviation ($\zeta=\frac{1}{2}$) or the variance ($\zeta=1$).

$$\rho(\Delta) = \frac{\Delta_T^\zeta}{\Delta_O^\zeta} \text{ with } \zeta = \frac{1}{2}, 1 \quad \text{Equation 12}$$

In order to produce a function that would allow introducing the ratio for determining the smoothing parameter that will result in the target precision, experimental data comprising a series of data collections of a flat wall at different distances ranging from 300 mm to 4500 mm, and at different ambient light levels (0 Klux, 3 kLux and 25 kLux), was used. When a given measurement was collected, g Gaussian filters were used to smooth the data in the complex domain, for determining the depth. The ratio of the jitter reduction ($\xi(\Delta)$) per filter and frame can be analyzed either temporarily, by using several frames within the distance and illumination, or spatially considering a kernel (Equation 13).

$$\xi(\Delta) = \frac{\Delta_F^\zeta}{\Delta_O^\zeta} \text{ with } \zeta = \frac{1}{2}, 1 \quad \text{Equation 13}$$

In Equation 13, $\Delta_O^\zeta$, $\Delta_F^\zeta$ are the temporal or spatial variability, with $\zeta=\frac{1}{2}$ expressing the standard deviation, and $\zeta=1$ the variance.

Figure 18:
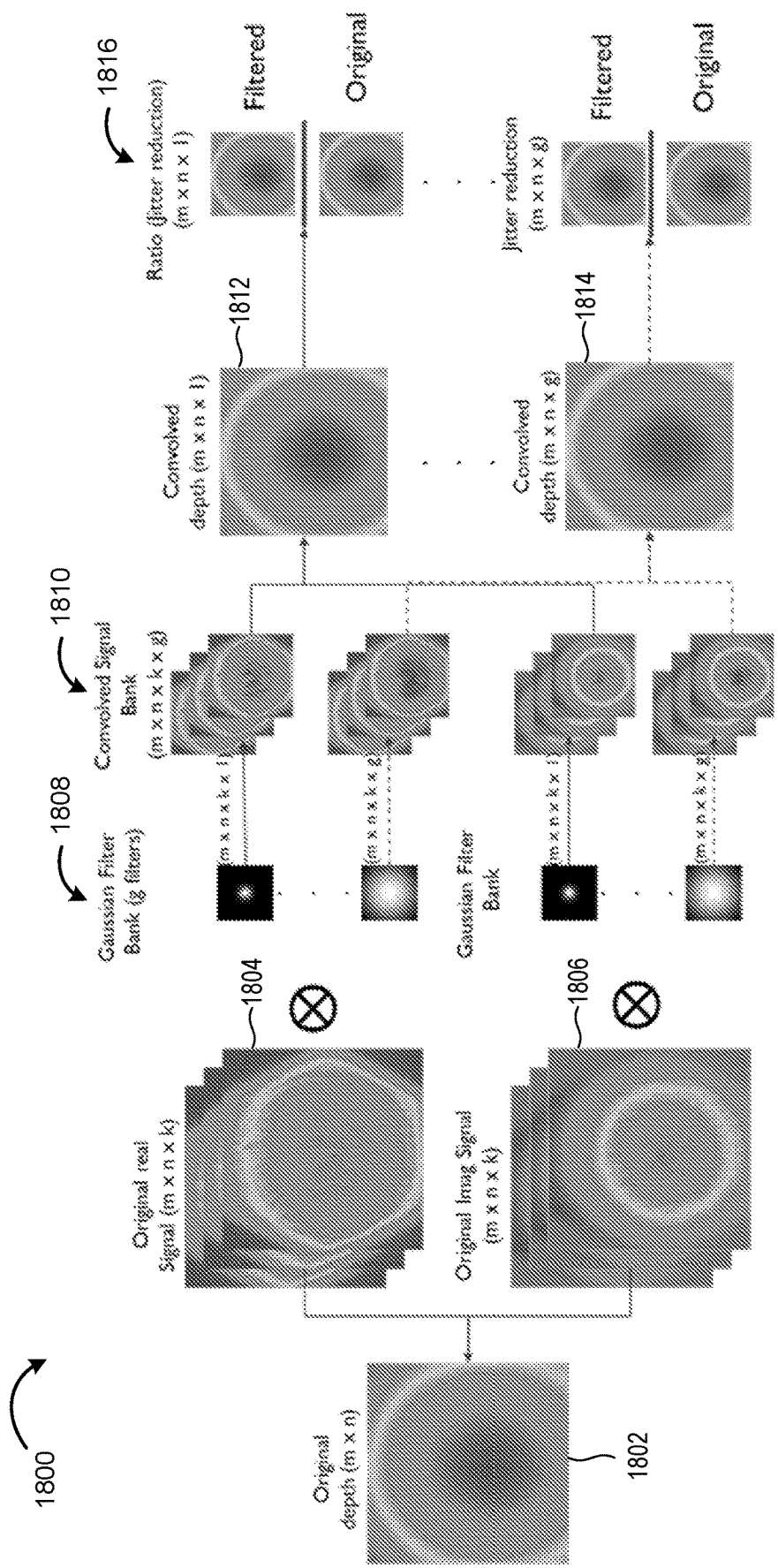
FIG. 18 schematically shows an example method of determining a ratio of jitter reduction for an example image frame.

FIG. 18 is a diagram illustrating such an example method 1800 of determining the ratio of jitter reduction $\xi(\Delta)$ for one example image frame to adaptively denoise the image frame.

The collected raw signal, represented by original image frame 1802, which comprises an original real signal 1804 and an original imaginary signal 1806, is convolved at 1808 with a Gaussian filter bank composed of filters with different smooth coefficients (ξ(Δ)). This produces a convolved signal bank at 1810, which is used to produce convolved image frames 1812 and 1814 to provide the ratio of jitter reduction at 1816.

When the process is repeated for the entire collection of measurements, the ratio of the jitter reduction ξ(Δ) can be represented in a scatter plot regarding the smoothing coefficient (ξ(Δ)) used to produce the smoothing. The data can be regressed using different functions. In the example experiments disclosed herein, the functions selected were a quadratic polynomial for the standard deviation variability, and a linear regression for the variance. The functions are shown below in Equation 14, with α, β, and γ the fitting constants. It will be understood that any other suitable functions may be used.

$$\lambda(\xi) = \begin{cases} \alpha\xi(\Delta)^2 + \beta\xi(\Delta) + \gamma & \text{for } \zeta = \frac{1}{2} \\ \beta\xi(\Delta) + \gamma & \text{for } \zeta = 1 \end{cases} \quad \text{Equation 14}$$

Figure 19:
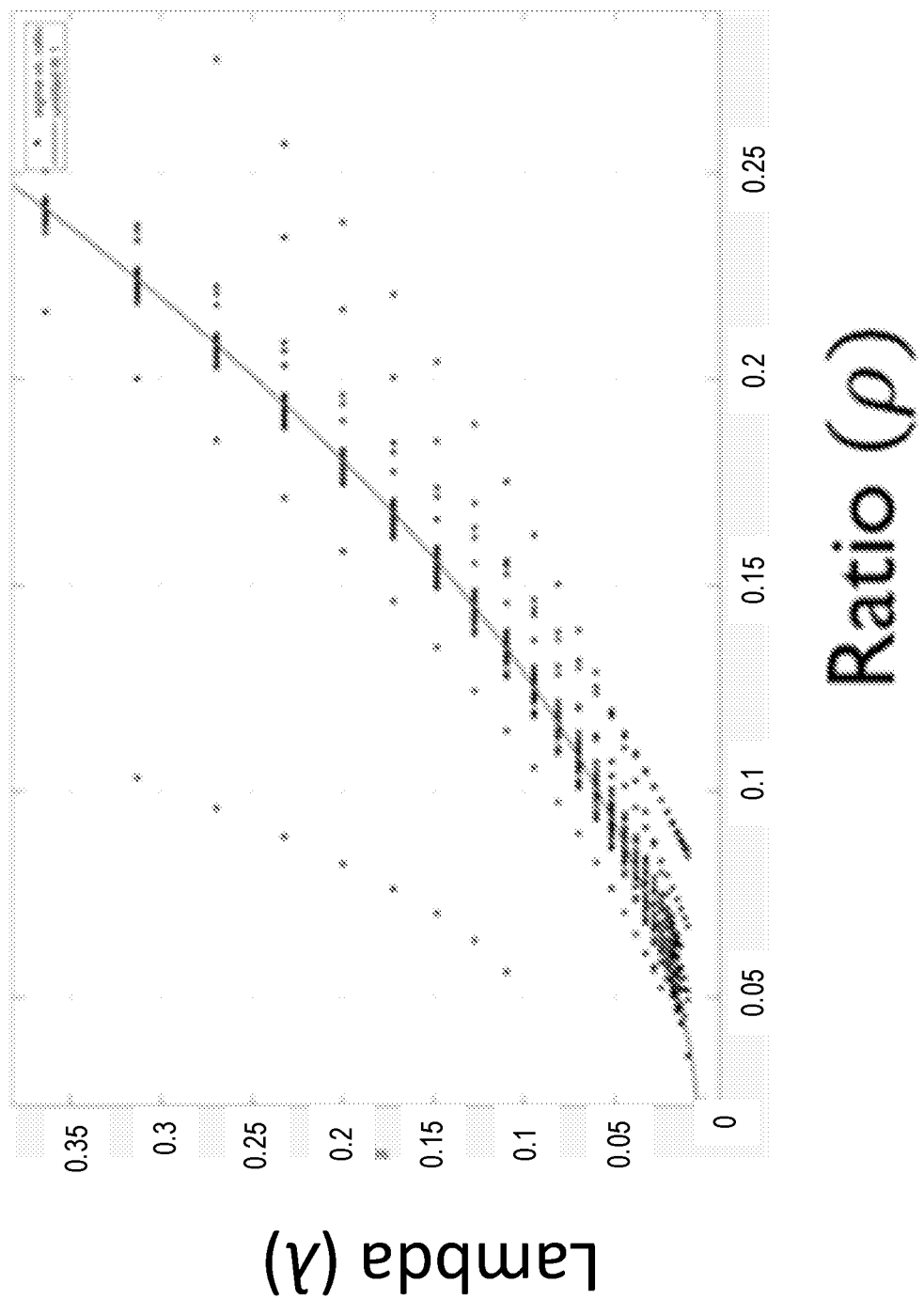
FIG. 19 shows a plot depicting example bisquare weighting of data regressions resulting from determining a ratio of jitter reduction for an example image frame.

To avoid outliers produced in the ratio due to unwrapping errors, a bi-square technique was applied to the regressions, such that the points farther from the fitted curve weigh less than the points that are closer to the fitted curve and that may be more densely clustered. FIG. 19 shows an example of applying such a bi-square technique, where the data regressions are fit to a second-degree polynomial from the ratio calculated for different frames, distances from the depth camera, and ambient light conditions. Table 2 shows example values resulting from the fitted functions that work either for the depth domain or for the complex domain.

TABLE 2

Data results of the polynomial regression for the standard deviation (SD) and the variance (VAR).

| ξ(Δ) | α | β | γ |
|---|---|---|---|
| SD | 6.589 | −0.098 | 0.003 |
| VAR | 0 | 6.29 | −0.004 |

The ratio of the jitter reduction (ξ(Δ)) may be related to the ratio ρ(Δ), using the required noise target for calculating ρ(Δ) (Equation 15).

$$\rho(\Delta) = \xi(\Delta) \quad \text{Equation 15}$$

Figure 20A:
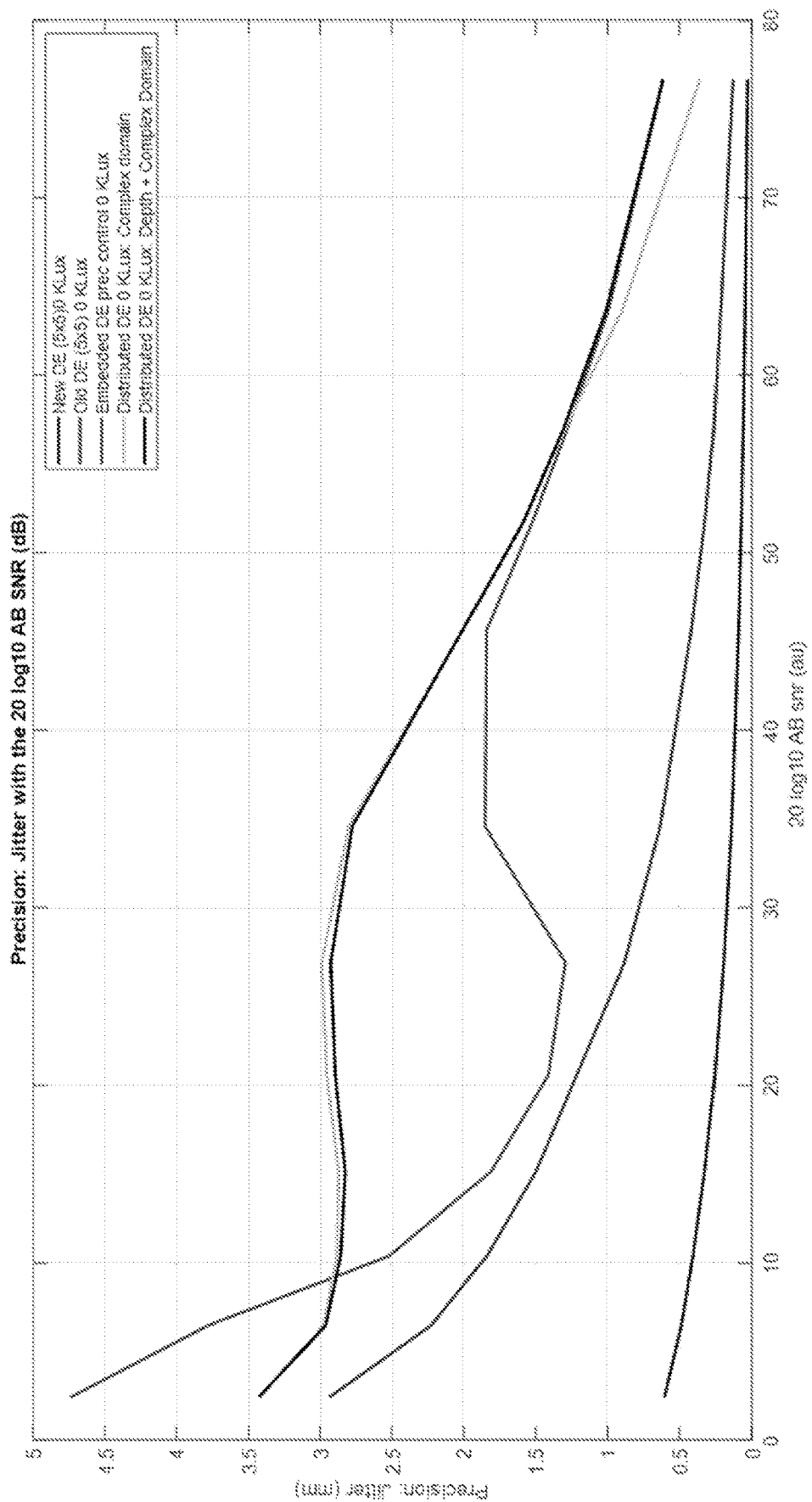
FIGS. 20A-20C show example precision control results of an experiment imaging a flat wall for various depth engine pipelines using a kernel 5×5 and 3 mm fixed precision, at 0 Klux, 3 Klux, and 25 Klux.
Figure 20B:
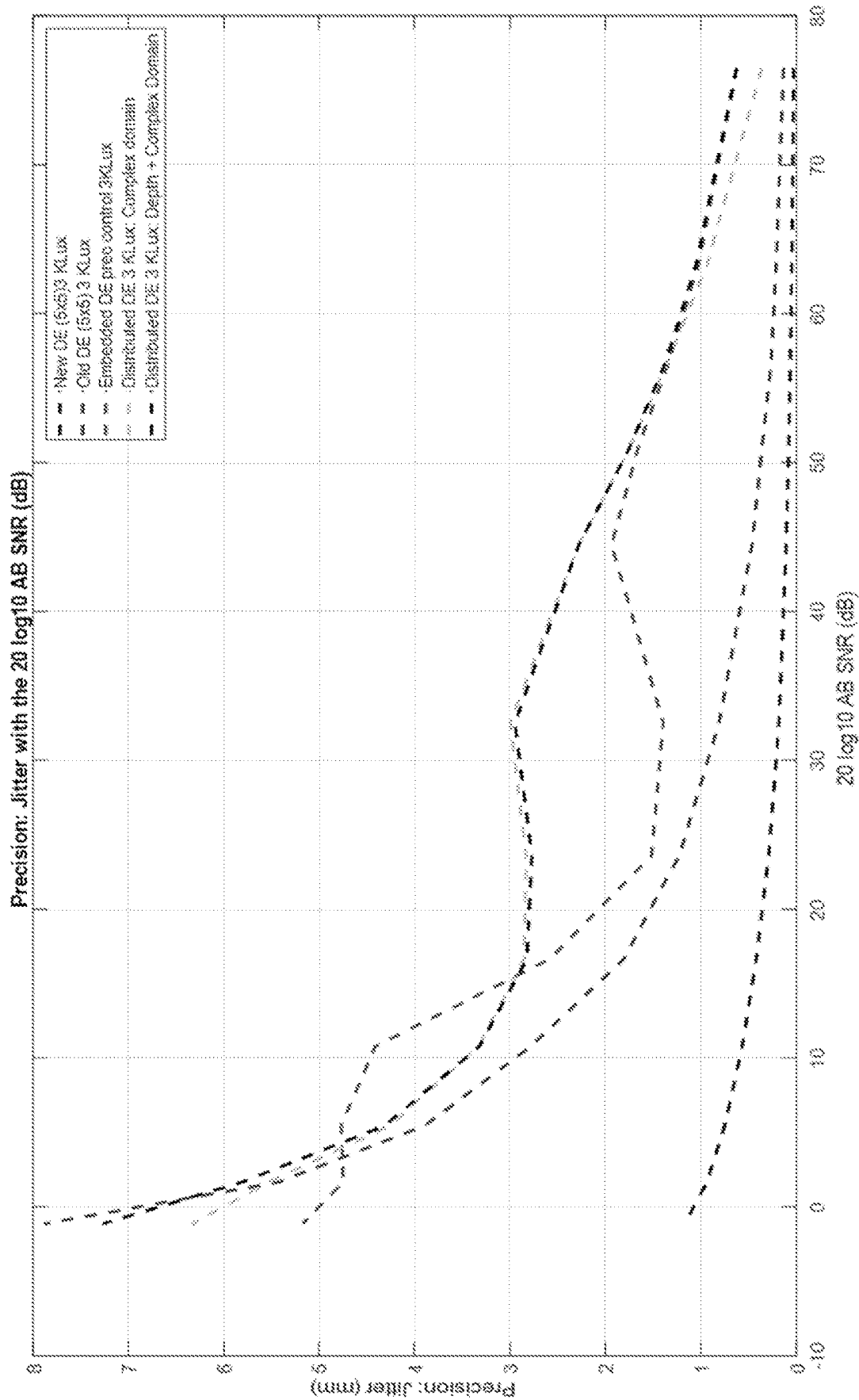
Figure 20C:
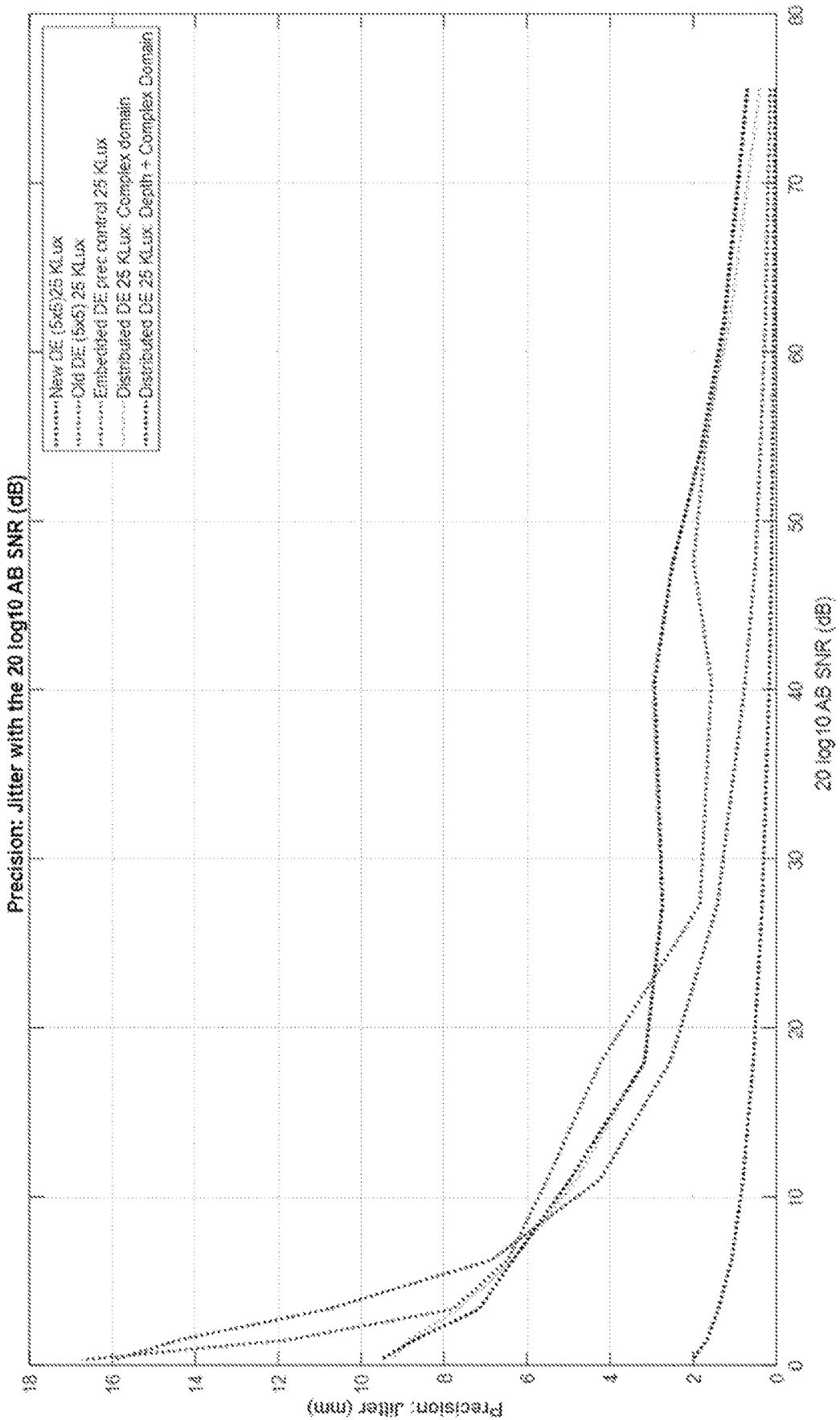
Figure 21A:
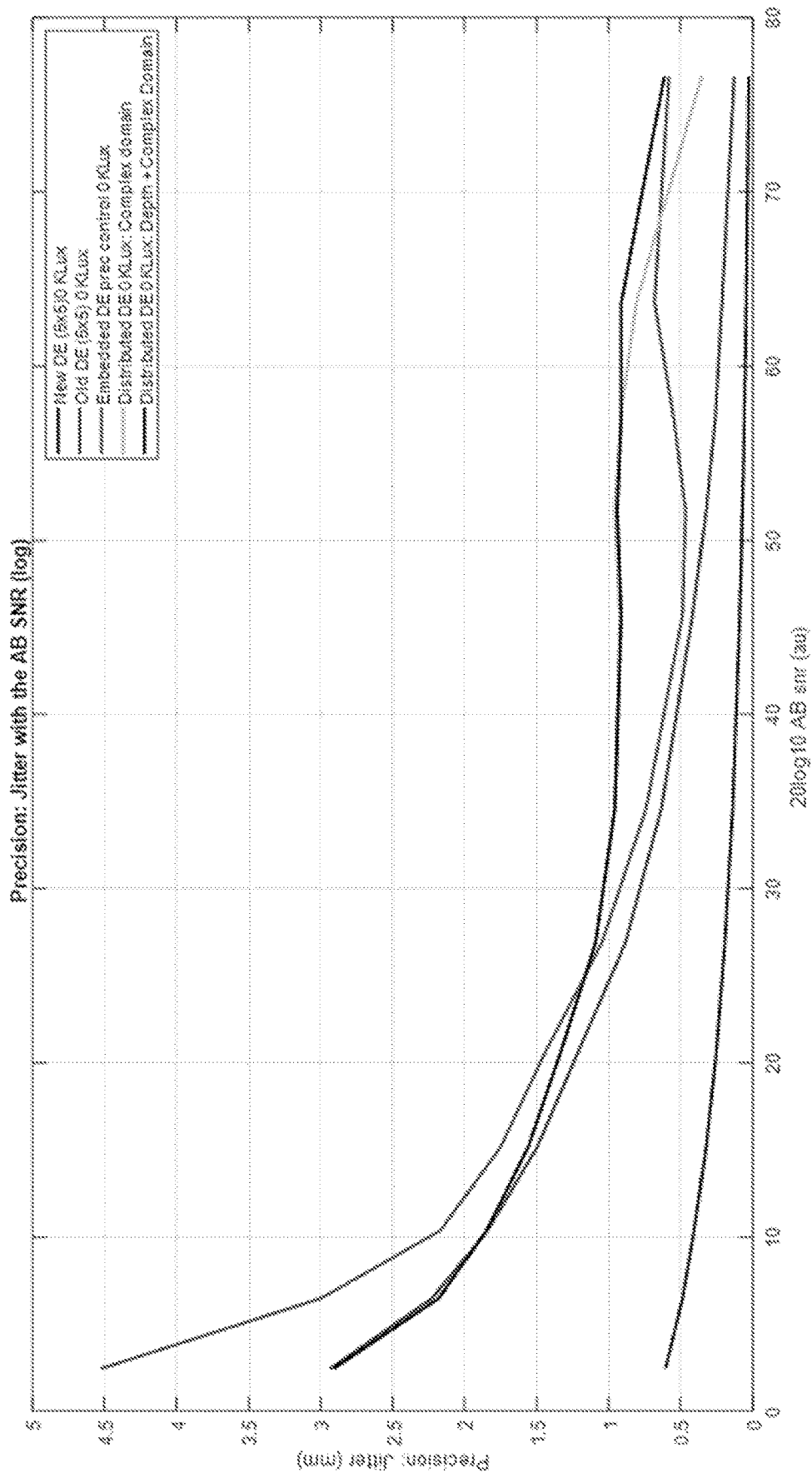
FIGS. 21A-21C show example precision control results of the experiment imaging a flat wall for various depth engine pipelines using a kernel 5×5 and 1 mm fixed precision, at 0 Klux, 3 Klux, and 25 Klux.
Figure 21B:
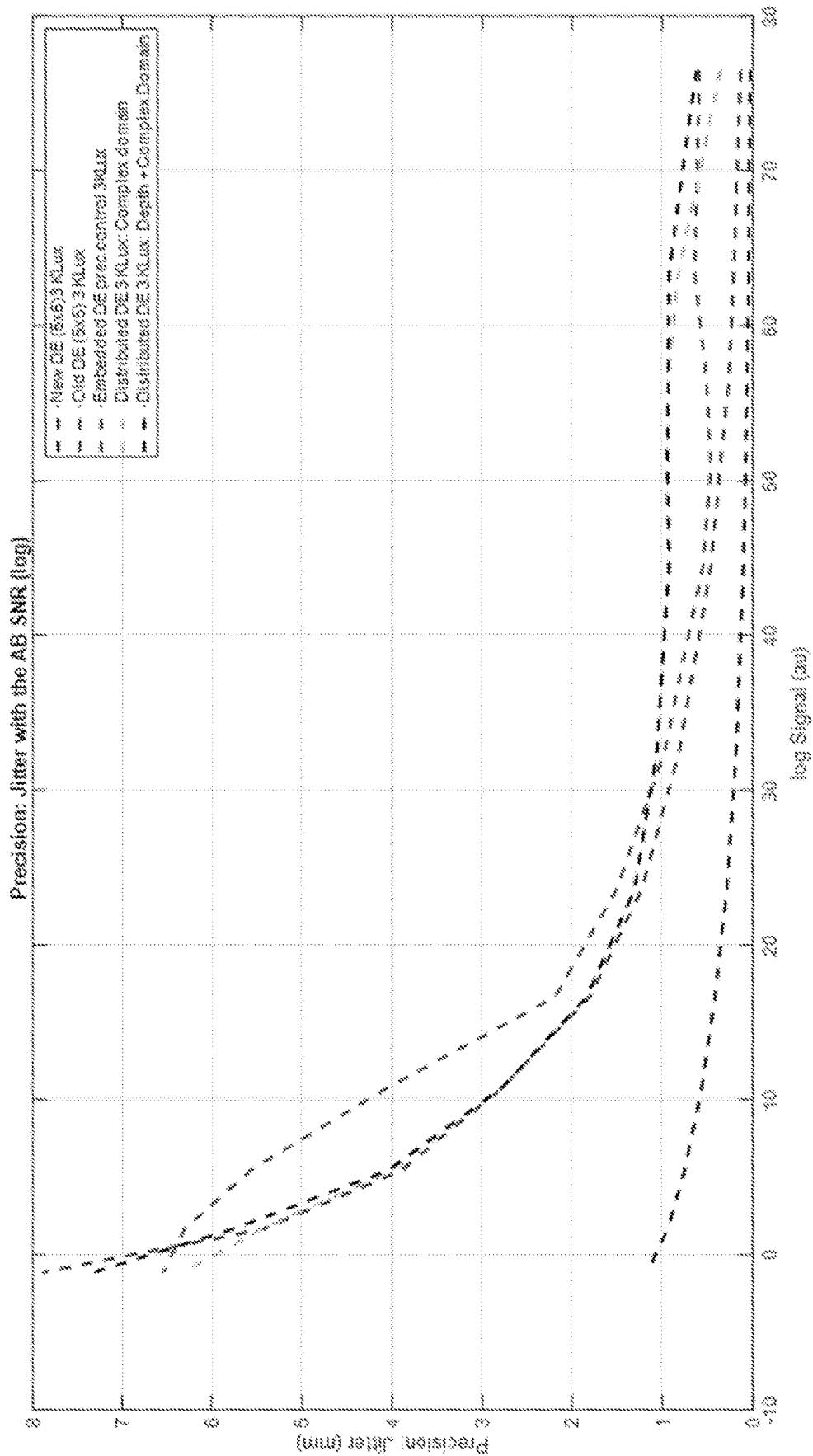
Figure 21C:
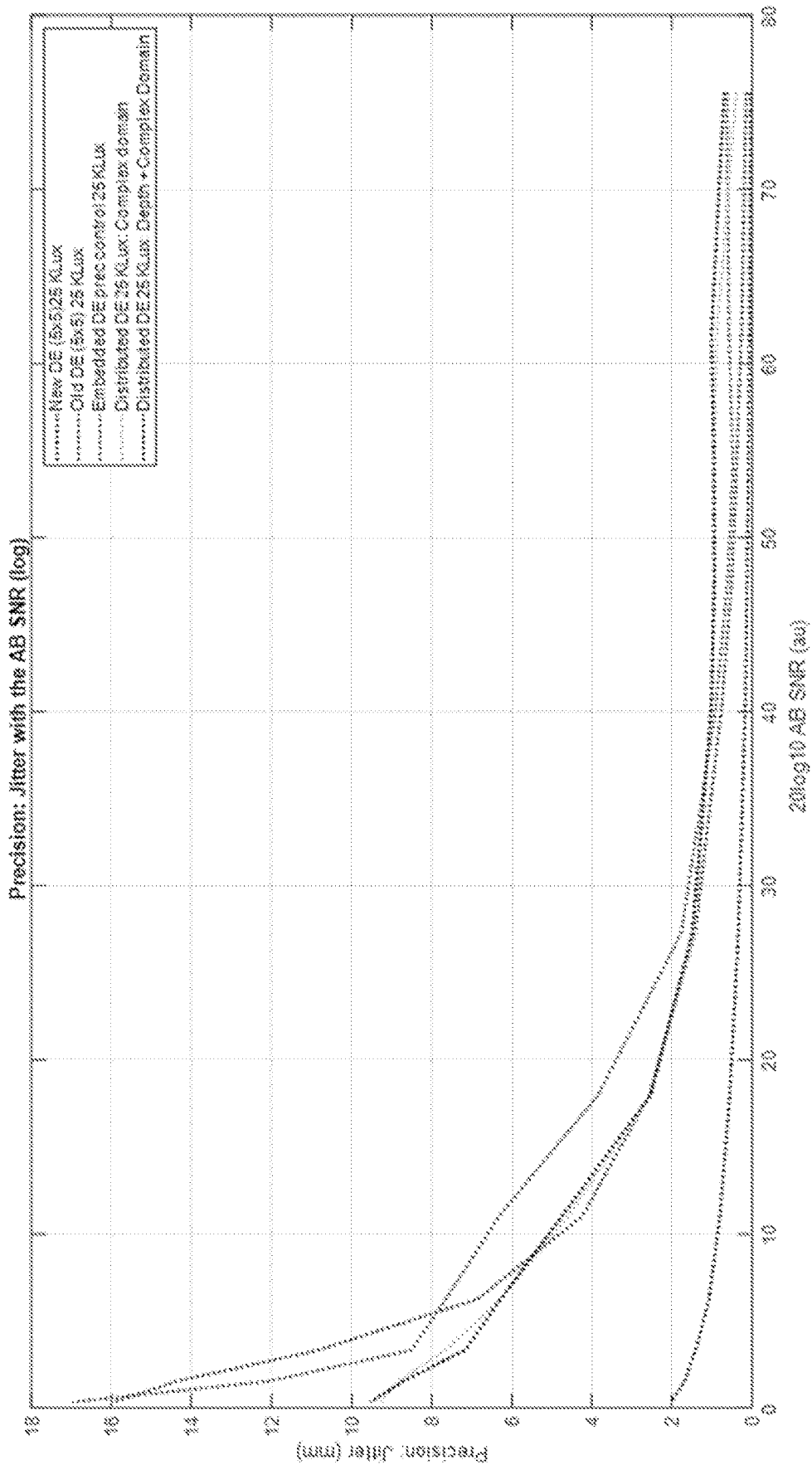
Figure 22A:
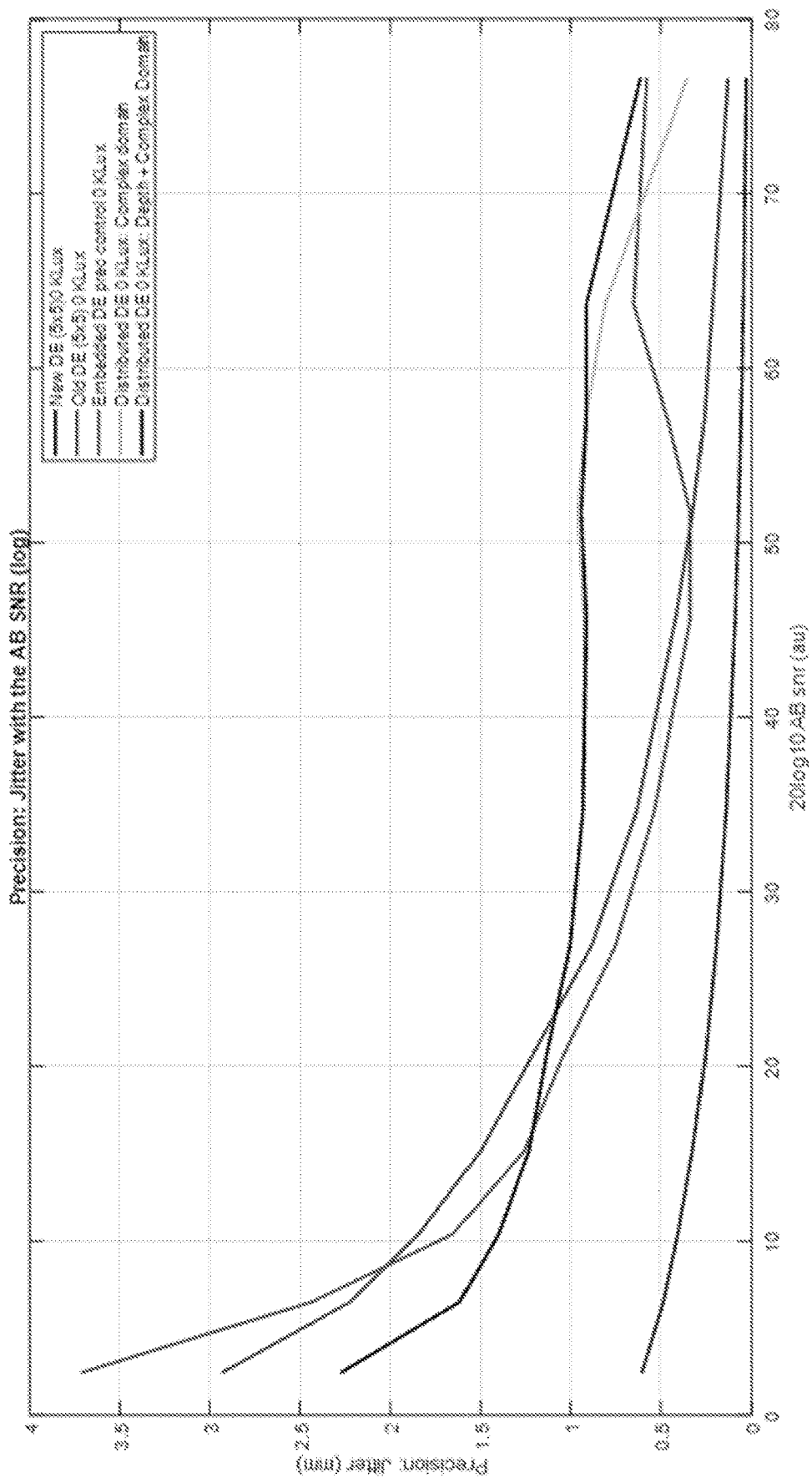
FIGS. 22A-22C show example precision control results of the experiment imaging a flat wall for various depth engine pipelines using g a kernel 7×7 and 1 mm fixed precision, at 0 Klux, 3 Klux, and 25 Klux.
Figure 22B:
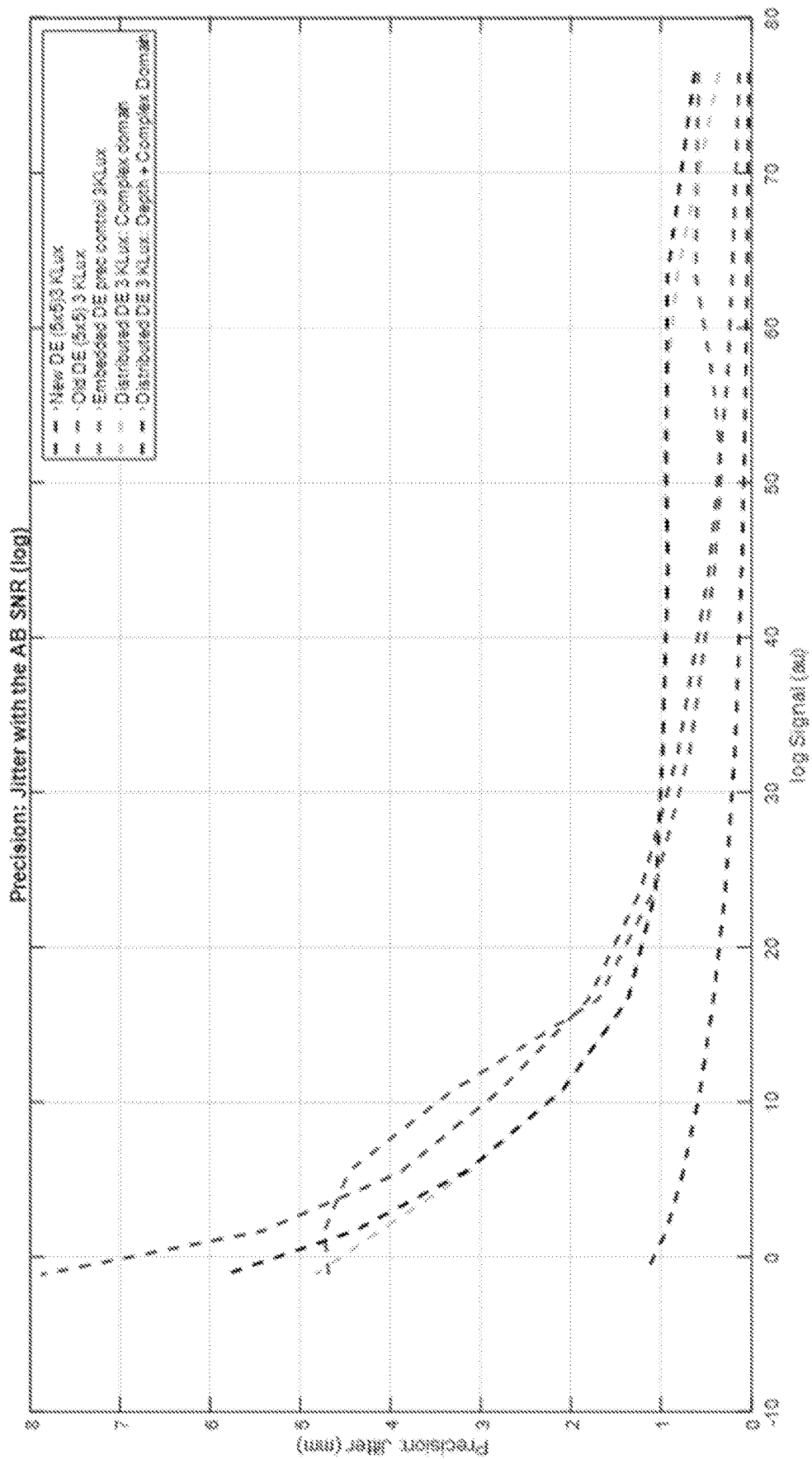
Figure 22C:
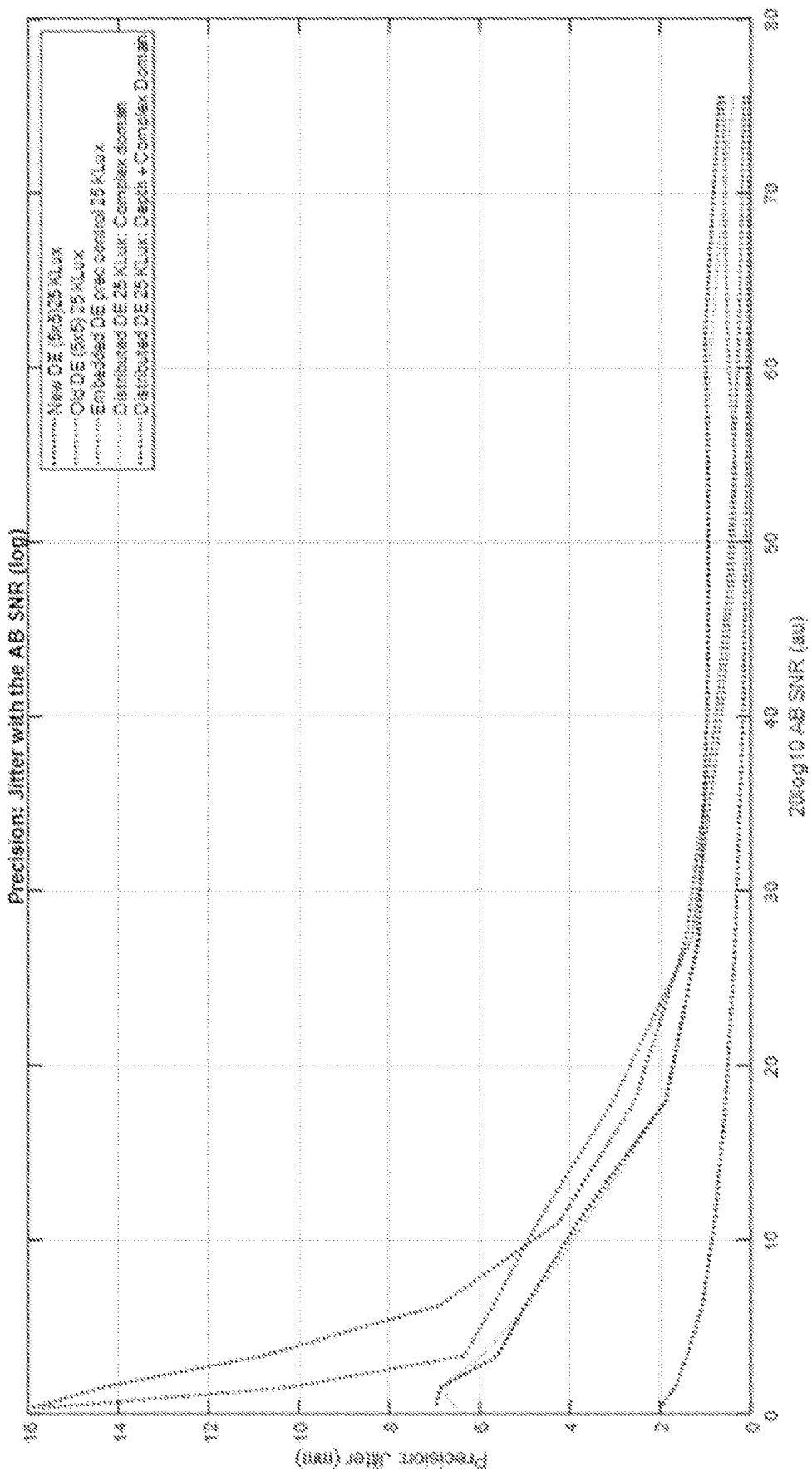

To evaluate the disclosed example adaptive jitter reduction techniques, three experiments were performed collecting images of a flat wall for different distances ranging from 300 to 4500 mm, using a long throw binned mode of the depth camera for three values of ambient light: 0 Klux, 3 Klux, and 25 Klux. The precision was evaluated temporally by using the standard deviation of 9 frames in a central region of the image (17×17). To confirm the validity of using either the standard deviation or the variance of the depth in the kernel for the calculation of λ, the standard deviation and the quadratic fitting was used for the complex domain, while the combination of depth and complex domain used the variance and the linear regression. The first experiment was performed using a 5×5 kernel with a precision fixed of 3 mm, results of which are shown in FIGS. 20A-C. The second experiment was performed using a 5×5 kernel with a precision fixed of 1 mm (FIGS. 21A-C). Finally, the last experiment was performed using a 7×7 kernel and precision fixed of 1 mm (FIGS. 22A-C). For comparison purposes, the results for embedded depth engine pipelines for two different depth pipelines labeled "old" and "new", are also included. The "old" pipeline utilizes a Joint Bilateral Filter (JBLF), while the "new" pipeline utilizes a filter referred to herein as a Truncated Joint Bilateral filter (TJBLF). The TJBLF does not use all coefficients calculated from a Taylor Expansion of the similarity between the pixels of a neighborhood, but uses an indicator function to make zero those coefficients below a threshold. The indicator function is adaptive, in that the threshold depends on the sum of variance of the similarity between pixels.

FIGS. 20A-C show the precision control results for a log AB SNR range using a 5×5 kernel and 3 mm fixed precision, at 0 Klux, 3 Klux, and 25 Klux, respectively. In the case of the embedded pipelines, the precision behaves quadratically with the SNR of the AB. However, for the distributed pipelines, there is a range from 10 (±10 dB depending on the ambient light), where the precision is flat around the 3 mm value. The embedded pipeline shows a high amount of smoothing, and a poorer behavior in terms of AB SNR. It is also noted that data with precision better than the target precision is not processed, and therefore increase quadratically to the target precision.

FIGS. 21A-C show the precision control results for a log AB SNR range using a 5×5 kernel and 1 mm fixed precision, at 0 Klux, 3 Klux, and 25 Klux, respectively. Similarly, in the embedded pipelines, the precision increases quadratically with the SNR of the AB. However, for the distributed pipelines, there is a range ending in 20 (±5 dB) depending on the ambient light, where the precision is around 1.5 mm. The embedded pipeline seems to smooth more than expected at high SNR, and not enough at low SNR.

FIGS. 22A-C show the precision control results for a log AB SNR range using a 7×7 kernel and 1 mm fixed precision, at 0 Klux, 3 Klux, and 25 Klux, respectively. Similarly, in the embedded pipelines, the precision increases quadratically with the SNR of the AB. However, for the distributed pipelines, there is a range ending in 12 (±5 dB) depending on the ambient light, where the precision is around 1.5 mm. The embedded pipeline seems to smooth more than expected, and its behavior for the low signal regions can be considered poorer than in the distributed pipelines. It is also noticeable that the data with precision better that the target one is not processed, and therefore they go quadratically up to the target level.

Figure 23:
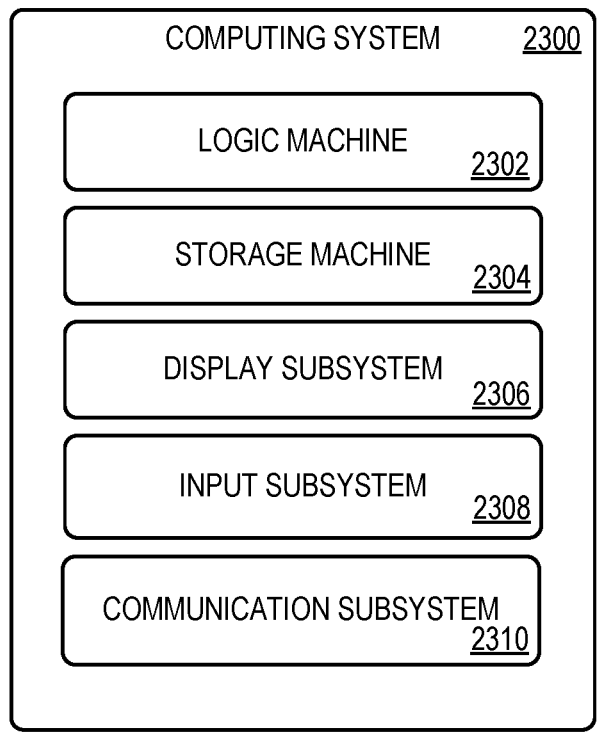
FIG. 23 shows a block diagram of an example computing system.

FIG. 23 schematically shows a non-limiting embodiment of a computing system 2300 that can enact one or more of the methods and processes described above. Computing system 2300 is shown in simplified form. Computing system 2300 may take the form of one or more personal computers, server computers, tablet computers, home-entertainment computers, network computing devices, gaming devices, mobile computing devices, mobile communication devices (e.g., smart phone), and/or other computing devices.

Computing system 2300 includes a logic machine 2302 and a storage machine 2304. Computing system 2306 may optionally include a display subsystem 2308, input subsystem 2310, communication subsystem 2312, and/or other components not shown in FIG. 23.

Logic machine 2402 includes one or more physical devices configured to execute instructions. For example, the logic machine 2302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 2302 may include one or more processors configured to execute software instructions. Additionally or alternatively, the logic machine 2302 may include one or more hardware or firmware logic machines configured to execute hardware or firmware instructions. Processors of the logic machine 2302 may be single-core or multi-core, and the instructions executed thereon may be configured for sequential, parallel, and/or distributed processing. Individual components of the logic machine 2302 optionally may be distributed among two or more separate devices, which may be remotely located and/or configured for coordinated processing. Aspects of the logic machine 2302 may be virtualized and executed by remotely accessible, networked computing devices configured in a cloud-computing configuration.

Storage machine 2304 includes one or more physical devices configured to hold instructions executable by the logic machine to implement the methods and processes described herein. When such methods and processes are implemented, the state of storage machine 2304 may be transformed—e.g., to hold different data.

Storage machine 2304 may include removable and/or built-in devices. Storage machine 2304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 2304 may include volatile, nonvolatile, dynamic, static, read/write, read-only, random-access, sequential-access, location-addressable, file-addressable, and/or content-addressable devices.

It will be appreciated that storage machine 2304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 2302 and storage machine 2304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2300 implemented to perform a particular function. In some cases, a module, program, or engine may be instantiated via logic machine 2302 executing instructions held by storage machine 2304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 2306 may be used to present a visual representation of data held by storage machine 2304. This visual representation may take the form of a graphical user interface (GUI). As the herein described methods and processes change the data held by the storage machine, and thus transform the state of the storage machine, the state of display subsystem 2306 may likewise be transformed to visually represent changes in the underlying data. Display subsystem 2306 may include one or more display devices utilizing virtually any type of technology. Such display devices may be combined with logic machine 2302 and/or storage machine 2304 in a shared enclosure, or such display devices may be peripheral display devices.

When included, input subsystem 2308 may comprise or interface with one or more user-input devices such as a keyboard, mouse, touch screen, or game controller. In some embodiments, the input subsystem 2308 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2310 may be configured to communicatively couple computing system 2300 with one or more other computing devices. Communication subsystem 2310 may include wired and/or wireless communication devices compatible with one or more different communication protocols. As non-limiting examples, the communication subsystem 2310 may be configured for communication via a wireless telephone network, or a wired or wireless local- or wide-area network. In some embodiments, the communication subsystem 2310 may allow computing system 2300 to send and/or receive messages to and/or from other devices via a network such as the Internet.

Another example provides a computing system comprising a logic machine, and a storage machine holding instructions executable by the logic machine to obtain time-of-flight (ToF) image data comprising a plurality of pixels, for each pixel of the ToF image data, determine one or more noise metrics by applying a spatial kernel, segment the ToF image data based on the one or more noise metrics to obtain differently classified pixels, during a denoising phase, process pixels of a first classification differently than pixels of a second classification, after the denoising phase, determine a depth image, and output the depth image. The ToF image data may additionally or alternatively be complex domain ToF image data. In such an example, the one or more noise metrics may additionally or alternatively include one or more of an average of the square of a degree of coherence, an average of the coefficients inside a spatial kernel, and a square cosine metric. In such an example, the ToF image data may additionally or alternatively include coarse depth data and active brightness data. In such an example, the one or more noise metrics may additionally or alternatively include one or more of a coefficient of variation and a coefficient of dispersion. In such an example, the instructions may additionally or alternatively be executable to compute complex domain ToF data from the coarse depth data, and denoise the complex domain ToF data in the denoising phase. In such an example, the instructions may additionally or alternatively be executable to compute complex domain ToF data for all pixels. In such an example, the instructions may additionally or alternatively be executable to compute complex domain ToF data selectively based upon classification. In such an example, the instructions may additionally or alternatively be executable to classify the pixels into high signal, edge region, and low signal classifications. In such an example, the instructions may additionally or alternatively be executable to adaptively denoise pixels of a first classification based upon values of the noise metric. In such an example, the instructions may additionally or alternatively be executable to adaptively denoise by applying a Gaussian blur kernel with parameters selected based upon values of noise metric. In such an example, the instructions may additionally or alternatively be executable to apply a fixed kernel to denoise pixels of a second classification. In such an example, the instructions may additionally or alternatively be executable to not perform denoising on pixels classified as edge pixels.

Another example provides, enacted on a computing device, a method for processing time-of-flight image data (ToF), the method comprising obtaining ToF image data comprising a plurality of pixels, for each pixel of ToF image data, determining one or more noise metrics by applying a spatial kernel, segmenting the ToF image data based on the one or more noise metrics to obtain differently classified pixels, during a denoising phase, processing pixels of a first classification differently than pixels of a second classification, after the denoising phase, determining a depth image, and outputting the depth image. The method may additionally or alternatively include classifying the pixels into high signal, edge region, and low signal classifications. The method may additionally or alternatively include adaptively denoising pixels of a high signal classification based upon values of the noise metric.

Another example provides a computing system comprising a logic machine, and a storage machine holding instructions executable by the logic machine to obtain time-of-flight (ToF) image data comprising a plurality of pixels, for each pixel of ToF image data, determine one or more noise metrics, during a denoising phase, apply an adaptive spatial denoising kernel comprising parameters selected for each pixel based upon determining the one or more noise metrics such that different denoising kernels are applied to different pixels, after the denoising phase, determine a depth image, and output the depth image. In such an example, the instructions may additionally or alternatively be executable to segment the ToF image data based upon one or more noise metrics to obtain differently classified pixels, and apply adaptive spatial denoising kernel to pixels of a first classification but not to pixels of a second classification. In such an example, the spatial denoising kernel may additionally or alternatively include a Gaussian denoising kernel. In such an example, the instructions may additionally or alternatively be executable to adaptively denoise pixels of a first classification based upon values of the noise metric.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a logic machine; and
a storage machine holding instructions executable by the logic machine to
obtain time-of-flight (ToF) image data comprising a plurality of pixels,
for each pixel of the ToF image data, determine one or more noise metrics by applying a spatial kernel,
segment the ToF image data based on the one or more noise metrics to obtain differently classified pixels,
during a denoising phase, process pixels of a first classification by applying an adaptive kernel and process pixels of a second classification by applying a fixed kernel,
after the denoising phase, determine a depth image, and output the depth image.

2. The computing system of claim 1, wherein the ToF image data is complex domain ToF image data.

3. The computing system of claim 2, wherein the one or more noise metrics comprise one or more of an average of the square of a degree of coherence, an average of the coefficients inside a spatial kernel, and a square cosine metric.

4. The computing system of claim 1, wherein the ToF image data comprises coarse depth data and active brightness data.

5. The computing system of claim 4, wherein the one or more noise metrics comprises one or more of a coefficient of variation and a coefficient of dispersion.

6. The computing system of claim 4, further comprising instructions executable to compute complex domain ToF data from the coarse depth data, and denoise the complex domain ToF data in the denoising phase.

7. The computing system of claim 4, where instructions are executable to compute complex domain ToF data for all pixels.

8. The computing system of claim 4, wherein instructions are executable to compute complex domain ToF data selectively based upon classification.

9. The computing system of claim 1, wherein the instructions are executable to classify the pixels into high signal, edge region, and low signal classifications.

10. The computing system of claim 1, wherein the instructions are executable to adaptively denoise pixels of the first classification based upon values of the noise metric.

11. The computing system of claim 10, wherein the instructions are executable to adaptively denoise by applying a Gaussian blur kernel with parameters selected based upon values of noise metric.

12. The computing system of claim 1, wherein the instructions are executable to not perform denoising on pixels classified as edge pixels.

13. Enacted on a computing device, a method for processing time-of-flight image data (ToF), the method comprising:
obtaining ToF image data comprising a plurality of pixels,
for each pixel of ToF image data, determining one or more noise metrics by applying a spatial kernel,
segmenting the ToF image data based on the one or more noise metrics to obtain differently classified pixels,
during a denoising phase, processing pixels of a first classification by applying an adaptive kernel and processing pixels of a second classification by applying a fixed kernel,
after the denoising phase, determining a depth image, and outputting the depth image.

14. The method of claim 13, further comprising classifying the pixels into high signal, edge region, and low signal classifications.

15. The method of claim 13, further comprising adaptively denoising pixels of a high signal classification based upon values of the noise metric.

16. A computing system, comprising:
a logic machine; and
a storage machine holding instructions executable by the logic machine to
obtain time-of-flight (ToF) image data comprising a plurality of pixels,
for each pixel of ToF image data, determine one or more noise metrics,
during a denoising phase, process pixels of a first classification by applying an adaptive spatial denoising kernel comprising parameters selected for each pixel based upon determining the one or more noise metrics and process pixels of a second classification by applying a fixed kernel,
after the denoising phase, determine a depth image, and output the depth image.

17. The computing system of claim 16, wherein the instructions are executable to segment the ToF image data based upon one or more noise metrics to obtain differently classified pixels.

18. The computing system of claim 16, wherein the spatial denoising kernel comprises a Gaussian denoising kernel.

19. The computing system of claim 16, wherein the instructions are executable to adaptively denoise pixels of the first classification based upon values of the noise metric.

* * * * *